(12) United States Patent
Taylor

(10) Patent No.: US 11,520,014 B2
(45) Date of Patent: Dec. 6, 2022

(54) THYRISTOR-BASED LIDAR DETECTOR ARRAY

(71) Applicant: Geoff W. Taylor, Wilton, NH (US)

(72) Inventor: Geoff W. Taylor, Wilton, NH (US)

( * ) Notice: Subject to any disclaimer, the term of this patent is extended or adjusted under 35 U.S.C. 154(b) by 553 days.

(21) Appl. No.: 16/619,929

(22) PCT Filed: Jun. 7, 2018

(86) PCT No.: PCT/US2018/036471
§ 371 (c)(1),
(2) Date: Dec. 5, 2019

(87) PCT Pub. No.: WO2018/226963
PCT Pub. Date: Dec. 13, 2018

(65) Prior Publication Data
US 2020/0142037 A1    May 7, 2020

Related U.S. Application Data

(60) Provisional application No. 62/516,950, filed on Jun. 8, 2017.

(51) Int. Cl.
*G01C 3/08* (2006.01)
*G01S 7/481* (2006.01)
(Continued)

(52) U.S. Cl.
CPC .......... *G01S 7/4816* (2013.01); *G01S 7/4863* (2013.01); *G01S 7/4865* (2013.01); *G01S 17/42* (2013.01); *G01S 17/894* (2020.01)

(58) Field of Classification Search
CPC ........ G01S 17/42; G01S 17/10; G01S 7/4863; G01S 7/4865
See application file for complete search history.

(56) References Cited

U.S. PATENT DOCUMENTS 4,302,084 A    11/1981    Greenwald et al.
5,670,787 A    9/1997    Pryor et al.
(Continued)

FOREIGN PATENT DOCUMENTS

WO    WO2002/071490 A1    9/2002

OTHER PUBLICATIONS

Time-of-Flight Camera—An Introduction, Larry Li, Texas Instruments Technical White Paper, SLOA190B, Jan. 2014 Revised May 2014.
(Continued)

*Primary Examiner* — Fabio S Lima
(74) *Attorney, Agent, or Firm* — Gordon & Jacobson, P.C.

(57) ABSTRACT

An optoelectronic integrated circuit is provided for use in a LIDAR system that includes a light source that is configured to emit an optical TOF pulse for reflection by an object. The integrated circuit includes an array of pixel elements arranged in columns and rows with at least one column line for each column of pixel elements. Each pixel element includes a vertical cavity thyristor device and a capacitor that are configured such that the capacitor generates a measured voltage signal corresponding to TOF of the optical TOF pulse that returns from the object. The measured voltage signal is transferred to the at least one column line for the pixel element in order to determine depth of the object. Switching action of the thyristor device due to absorption of light of the TOF return pulse can be configured to interrupt a charge integration function of the capacitor such that the capacitor generates the measured voltage signal corresponding to TOF of the optical TOF pulse. Other embodiments are provided that employ the thyristor devices of the pixel elements of spatial imaging of the object.

34 Claims, 14 Drawing Sheets

(51) Int. Cl.
    *G01S 17/894*    (2020.01)
    *G01S 7/4863*    (2020.01)
    *G01S 7/4865*    (2020.01)
    *G01S 17/42*    (2006.01)

(56) References Cited

U.S. PATENT DOCUMENTS

| | | |
|---|---|---|
| 6,031,243 A | 2/2000 | Taylor |
| 6,841,795 B2 | 1/2005 | Taylor et al. |
| 6,849,866 B2 | 2/2005 | Taylor |
| 6,853,014 B2 | 2/2005 | Taylor et al. |
| 6,870,207 B2 | 3/2005 | Taylor |
| 6,873,273 B2 | 3/2005 | Taylor et al. |
| 6,954,473 B2 | 10/2005 | Dehymubed et al. |
| 7,332,752 B2 | 2/2008 | Taylor et al. |
| 9,082,637 B2 | 7/2015 | Taylor |
| 9,490,336 B1 | 11/2016 | Taylor |
| 9,614,112 B2 | 4/2017 | Taylor |
| 11,362,203 B2 * | 6/2022 | Salcedo .............. H01L 27/1207 |
| 2004/0079971 A1 | 4/2004 | Taylor |
| 2017/0350966 A1 * | 12/2017 | Hartmann ............... G01S 17/42 |
| 2018/0143323 A1 * | 5/2018 | List ....................... G01S 7/4813 |

OTHER PUBLICATIONS

Search Report and Written Opinion dated Aug. 23, 2018 of PCT International Application No. PCT/US18/36471.
U.S. Appl. No. 09/798,316, filed Mar. 2, 2001.
U.S. Appl. No. 08/949,504, filed Oct. 14, 1997.
U.S. Appl. No. 09/710,217, filed Nov. 10, 2000.
U.S. Appl. No. 60/376,238, filed Apr. 26, 2002.
U.S. Appl. No. 10/323,513, filed Dec. 19, 2002.
U.S. Appl. No. 14/222,840, filed Mar. 24, 2014.

* cited by examiner

| | |
|---|---|
| P-type Ohmic Contact | 30 |
| P-type layer(s) | 28 |
| Undoped Spacer Layer | 26 |
| N-type Modulation Doped QW Structure | 24 |
| Spacer Layer(s) | 22 |
| P-type Modulation Doped QW Structure | 20 |
| Undoped spacer layer | 18 |
| N-type layer(s) | 16 |
| N-type Ohmic Contact | 14 |
| Bottom DBR Mirror | 12 |
| Substrate | 10 |

FIG. 4

| layer material | layer doping type | typical doping concentration (atoms/cm3) | typical layer thickness (Å) | label | label in Fig. 4 | Notes |
|---|---|---|---|---|---|---|
| GaAs | UD | | 300 | 173 | 30 | |
| GaAs | P++ | 1E20 | 600 | 171 | 30 | top ohmic contact |
| GaAs | P++ | 7E18 | 658 | 169 | 28 | |
| GaAs | P++ | 7E18 | 6 | 167 | 28 | |
| Al(0.7)Ga(0.3)As | P++ | 7E18 | 10 | 165 | 28 | optical waveguide cladding and confinement |
| Al(0.7)Ga(0.3)As | P | 5E17 | 960 | 163 | 28 | |
| Al(0.7)Ga(0.3)As | P++ | 7E18 | 10 | 161 | 28 | |
| GaAs | P++ | 7E18 | 12 | 159 | 28 | capping layer |
| Al(0.15)Ga(0.85)As | P++ | 7E18 | 80 | 157 | 28 | top plate of top capacitor |
| Al(0.15)Ga(0.85)As | UD | | 300 | 155 | 26 | |
| Al(0.15)Ga(0.85)As | N+ | 3.5E18 | 80 | 153 | 24 | N+ charge sheet - bottom plate of top capacitor and modulation doping layer |
| Al(0.15)Ga(0.85)As | UD | | 30 | 151 | 24 | N-type Modulation Doped QW structure |
| GaAs | UD | | 15 | 149 | 24 | |
| In(0.2)Ga(0.8)As ] x 3 | UD | | 60 | 147 | 24 | |
| GaAs ] x 3 | UD | | 100 | 145 | 24 | |
| GaAs | UD | | 400 | 143 | 24 | |
| Al(0.15)Ga(0.85)As | UD | | 2170 | 141 | 22 | spacer - collector region for NHFET |
| GaAs | UD | | 20 | 139 | 22 | spacer |
| Al(0.15)Ga(0.85)As | UD | | 2170 | 137 | 22 | spacer - collector region for PHFET |
| GaAs | UD | | 400 | 135 | 20 | P-type Modulation Doped QW structure |
| GaAs ] x 3 | UD | | 100 | 133 | 20 | |
| In(0.2)Ga(0.8)As ] x 3 | UD | | 60 | 131 | 20 | |
| GaAs | UD | | 15 | 129 | 20 | |
| Al(0.15)Ga(0.85)As | UD | | 60 | 127 | 20 | |

FIG. 5A

| layer material | layer doping type | typical doping concentration (atoms/cm3) | typical layer thickness (Å) | label | label in Fig. 4 | Notes |
|---|---|---|---|---|---|---|
| Al(0.15)Ga(0.85)As | P+ | 7E18 | 25 | 125 | 20 | P+ charge sheet - top plate of bottom capacitor and modulation doping layer |
| Al(0.15)Ga(0.85)As | UD | | 300 | 123 | 18 | |
| Al(0.15)Ga(0.85)As | N+ | 3.5E18 | 80 | 121 | 16 | bottom plate of bottom capacitor |
| GaAs | N+ | 3.5E18 | 12 | 119 | 16 | optical waveguide cladding and confinement |
| Al(0.15)Ga(0.85)As | N+ | 3.5E18 | 20 | 117 | 16 | |
| GaAs | N+ | 3.5E18 | 12 | 115 | 16 | |
| Al(0.7)Ga(0.3)As | N+ | 3.5E18 | 1000 | 113 | 14 | |
| GaAs | N+ | 3.5E18 | 2881 | 111 | 14 | bottom ohmic contact |
| GaAs | UD | | 200 | 109 | 12 | |
| AlAs | UD | | 845 | 107 | 12 | bottom DBR mirror |
| GaAs ) x 27 | UD | | 710 | 105 | 12 | |
| AlAs ) x 27 | UD | | 845 | 103 | 12 | |
| GaAs Substrate | SI | | | 101 | 10 | |

FIG. 5B

THYRISTOR-BASED LIDAR DETECTOR ARRAY

CROSS REFERENCE TO RELATED APPLICATION(S)

This application is the national stage of International Patent Application No. PCT/US2018/036471, filed Jun. 7, 2018, which claims priority to U.S. Provisional Patent Application No. 62/516,950, filed Jun. 8, 2017, the entire contents of which are herein incorporated by reference in their entireties.

BACKGROUND

1. Field

The present application relates to semiconductor integrated circuits that implement a LIDAR detector array, which employs an array of sensor elements that measure the time of flight of reflected light pulses to determine distance to an object.

2. State of the Art

Light Detection and Ranging (LIDAR) is a sensing technique that uses laser pulses to detect the presence and shape of an object. Current LIDAR technology uses a series of laser pulses that are emitted from an illumination source (typically a solid-state laser or a VCSEL array) and illuminate a field of view. An array of detectors measure time-of-flight (TOF) information, which is used to determine the spatial depth (z) of an object within the field of view. The TOF information is proportional to the distance at any point on the object and is sensed through the phase of the detected optical signal which is established by comparison in time to a reference signal (the range signal which is also used to drive the optical source).

In many systems, each detector of the detector array accumulates the detected signal over several cycles of driving the illumination source by using the in-phase (I) and quadrature (Q) components of the detected signal to integrate charge on two separate capacitors. In these systems, a system of four equations corresponding to four measurements are solved with trigonometric relations, and then I and Q components are calculated to find the phase of the detected signal (which is proportional to the distance at the corresponding point on the object). Therefore, two phase clocks are required, and the amount of charge integrated and therefore the useable output signal is proportional to the received photocurrent. Thus, in cases of weak reflectivity from the object or high loss in the medium, many cycles of source light are required to detect a signal sufficiently above the background noise and suitable for AD conversion.

Furthermore, signal recovery can be influenced by offset voltage resulting from the effects of the ambient light in the field of view. To remove these effects, additional time sequences are required in the dark to produce additional unknowns and thus equations to be solved to remove these effects.

Moreover, gain error can be caused by unequal capacitors. Such gain error can increase the number of unknowns in the system and therefore requires additional measurements producing more equations to be solved to obtain a solution. Other limitations of the dual capacitor detection scheme include the demodulation contrast ratio and the non-ideality (finite on resistance) of the switches used to connect and isolate the capacitors from the detector element.

Finally, the modulation and demodulation waveforms are unavoidably closer to sinusoids than square waves, and thus sines and cosines are required in the equation solutions.

These issues result in complexity and high costs in implementing such LIDAR systems.

LIDAR systems can also be combined with spatial imaging to provide a full three-dimensional (3D) imaging system. FIG. 1 shows a prior art 3D imaging system which employs an IR light source and depth image CMOS sensor that cooperate under control of an ASIC to provide the LIDAR function that measures time-of-flight (TOF) information, which is used to sense the spatial depth (z) of objects within the field of view. The prior art 3D imaging system also includes a separate color image CMOS sensor that operates under control of the ASIC to sense the spatial color (x,y) of objects within the field of view. The ASIC combines the spatial depth (z) information measured by the depth image CMOS sensor and the spatial color (x,y) information measured by the separate color image CMOS sensor.

Such prior art 3D imaging systems suffer from complexity and high costs that arise from the use of the separate color image CMOS sensor as well as the ASIC functionality that combines the spatial depth information measured by the LIDAR function and the spatial color information measured by the separate color image CMOS sensor.

SUMMARY

An improved optoelectronic integrated circuit is provided for use in a LIDAR system that includes a light source that is configured to emit an optical TOF pulse for reflection by an object. The optoelectronic integrated circuit includes an array of pixel elements arranged in columns and rows with at least one column line for each column of pixel elements. Each pixel element includes a vertical cavity thyristor device and a capacitor that are configured such that the capacitor generates a measured voltage signal corresponding to TOF of the optical TOF pulse that returns from the object. The measured voltage signal is transferred to the at least one column line for the pixel element in order to determine depth of the object.

In embodiments, the vertical cavity thyristor device is configured to switch from an OFF state to an ON state due to absorption of light of the optical TOF pulse that returns from the object. Such thyristor switching action can be configured to interrupt a charge integration function of the capacitor such that the capacitor generates the measured voltage signal corresponding to TOF of the optical TOF pulse that returns from the object.

In embodiments, the vertical cavity thyristor device has an anode terminal and a cathode terminal; and each pixel element further includes at least one charging transistor, operably coupled between a voltage supply terminal and the capacitor, that is configured to charge the capacitor when the vertical cavity thyristor device is in its OFF state based on voltage of the anode terminal, voltage of the cathode terminal, or both.

In embodiments, the at least one charging transistor can include an n-type HFET transistor and a p-type HFET transistor, the n-type HFET transistor having a gate terminal that is connected to the anode terminal with a source-drain current path between a positive voltage supply terminal and the capacitor, and the p-type HFET transistor having a gate terminal that is connected to the cathode terminal with a source-drain current path between a negative voltage supply terminal and the capacitor. The switching action of the vertical cavity thyristor device from its OFF state to its ON state due to absorption of light of the optical TOF pulse that returns from the object switches the source-drain current paths of the n-type HFET and the p-type HFET transistors ON.

In embodiments, each pixel element can further include at least one charge transfer transistor, operably coupled between the capacitor and the at least one column line for the pixel element, that is activated to transfer the measured voltage signal to at least one column line for the pixel element.

In embodiments, the at least one charge transfer transistor can include at least one thyristor-controlled charge transfer transistor that is activated based on voltage of the anode terminal, voltage of the cathode terminal, or both in order to transfer the measured voltage signal to at least one column line for the pixel element when the vertical cavity thyristor device switches from the OFF state to the ON state due to absorption of the optical TOF pulse that returns from the object.

In embodiments, the at least one thyristor-controlled charge transfer transistor can include an n-type HFET transistor and a p-type HFET transistor, the p-type HFET transistor having a gate terminal that is connected to the anode terminal with a source-drain current path coupled between a terminal of the capacitor and a column line for the pixel element, the n-type HFET transistor having a gate terminal that is connected to the cathode terminal with a source-drain current path between another terminal of the capacitor and another column line for the pixel element. The source-drain current paths of the p-type HFET and the n-type HFET transistors turn ON when the vertical cavity thyristor device switches from the OFF state to the ON state due to absorption of the optical TOF pulse that returns from the object.

In embodiments, the at least one charge transfer transistor can further include at least one reset isolation transistor that is configured to isolate the pixel element from the at least one column line for the pixel element in response to an electrical activation pulse that resets the vertical cavity thyristor device into its OFF state and empties any charge stored by the capacitor of the pixel element.

In embodiments, the at least one reset isolation transistor can include an n-type HFET transistor and a p-type HFET transistor, the p-type HFET transistor having a gate terminal that receives the electrical activation pulse with a source-drain current path coupled between a terminal of the capacitor and a column line for the pixel element, and the n-type HFET transistor having a gate terminal that receives a complement electrical activation pulse with a source-drain current path between another terminal of the capacitor and another column line for the pixel element. The source-drain current paths of the p-type HFET and the n-type HFET transistors turn OFF in response to the electrical activation pulse and complement electrical activation pulse.

In embodiments, each pixel element can further include at least one thyristor reset transistor configured to switch the vertical cavity thyristor device ON and then OFF in response to an electrical activation pulse in order to activate the at least one charging transistor and initiate charging of the capacitor.

In embodiments, the vertical cavity thyristor device can include an n-channel control terminal and/or a p-channel control terminal; and the at least one thyristor reset transistor can include at least one of a first p-type HFET transistor, a first n-type HFET transistor, a second p-type HFET transistor, and a second n-type HFET transistor. The first p-type HFET transistor (if used) has a gate terminal that receives the electrical activation pulse with a source-drain current path coupled between a positive voltage supply terminal and the n-channel control terminal. The first n-type HFET transistor (if used) has a gate terminal that receives the electrical activation pulse with a source-drain current path between a negative voltage supply terminal and the n-channel control terminal. The second p-type HFET transistor (if used) has a gate terminal that receives a complement electrical activation pulse with a source-drain current path coupled between the positive voltage supply terminal and the p-channel control terminal. The second n-type HFET transistor (if used) has a gate terminal that receives the complement electrical activation pulse with a source-drain current path between a negative voltage supply terminal and the p-channel control terminal.

In embodiments, each pixel element can further include a capacitor reset transistor that is configured to empty charge stored by the capacitor in response to the electrical activation pulse (or a complement electrical activation pulse).

In embodiments, the capacitor reset transistor can be an HFET transistor with a source-drain current path that is activated by the electrical activation pulse (or complement electrical activation pulse) such that resistance of the source-drain current path empties charge stored by the capacitor.

In embodiments, the pixel elements of a row of the array can be operated by supplying the electrical activation pulse (and optionally a complement electrical activation pulse) to the pixels elements of the row to thereby initiate a TOF detection period that follows the electrical activation pulse for the pixel elements of the row. These operations can be repeated for the different rows of the array to produce spatial depth data of the object.

In embodiments, the integrated circuit can further include a plurality of analog-to-digital conversion circuits each corresponding to a different column of pixel elements and operably coupled to the at least one column line for the corresponding column of pixel elements. Each analog-to-digital conversion circuit can be configured to convert the voltage signals output by the corresponding column of the pixel elements into the digital domain in order to determine the depth of the object.

In embodiments, each pixel element can optionally include an amplifier circuit that amplifies the measured voltage signal generated by the capacitor of the pixel element for supply to the corresponding at least one column line.

In embodiments, the at the least one column line for each column of pixel elements can be a pair of differential column lines. Alternatively, the at the least one column line for each column of pixel elements can be a single column line.

In embodiments, the integrated circuit can further include at least one other column line for each column of pixel elements, which is used for spatial imaging of the object. In this embodiment, the vertical cavity thyristor device of each pixel element is further configured in its OFF state to absorb other light that is reflected by the object and generate photocurrent at the anode terminal and cathode terminal of the vertical cavity thyristor device. Such photocurrent is transferred to the at least one other column line for the pixel element for the spatial imaging of the object.

In embodiments, the other light that is reflected by the object and absorbed by the vertical cavity thyristor device is ambient visible light, and a color filter is associated with the vertical cavity thyristor device and configured to transmit a predetermined color of visible light to the vertical cavity thyristor device.

In embodiments, the other light that is reflected by the object and absorbed by the vertical cavity thyristor device comprises infrared light that is emitted by a continuous IR light source.

In embodiments, each pixel element can further include at least one current transfer transistor, operably coupled between at least one of the anode terminal and cathode terminal of the vertical cavity thyristor device, that is activated to transfer the photocurrent generated by the vertical cavity thyristor device to at least one other column line for the pixel element.

In embodiments, the at least one current transfer transistor can be activated to transfer the photocurrent generated by the vertical cavity thyristor device to at least one other column line for the pixel element in response to an electrical signal that follows an electrical activation pulse that resets the vertical cavity thyristor device into its OFF state. The electrical signal can be further configured to deactivate the at least one current transfer transistor of each pixel element in order to isolate the pixel element from the at least one other column line for the pixel element for a TOF detection period.

In embodiments, the at least one current transfer transistor comprises an HFET transistor having a gate terminal that receives the electrical signal with a source-drain current path coupled between one of the anode terminal and cathode terminal of the vertical cavity thyristor device and one other column line of the pixel element used for spatial imaging.

In embodiments, the pixel elements of a row of the array can be controlled by supplying a first electrical activation pulse (and optionally a first complement electrical activation pulse) to the pixels elements of the row in order to reset the vertical cavity thyristor devices of the pixel elements of the row, followed by an electrical signal (and optionally a complement electrical signal) that activates the at least one current transfer transistor of the pixel elements of the row in order to initiate an imaging detection period, and followed by a second electrical activation pulse (and optionally a second complement electrical activation pulse) to the pixels elements of the row in order to reset the vertical cavity thyristor devices of the pixel elements of the row and initiate a TOF detection period that follows the image detection period for the pixel elements of the row. These operations can be repeated for the different rows of the array to produce spatial depth data and spatial image data of the object.

In embodiments, the integrated circuit can further include a plurality of analog-to-digital conversion circuits each corresponding to a different column of pixel elements and operably coupled to the at least one other column line for the corresponding column of pixel elements, where each analog-to-digital conversion circuit is configured to convert the signals output by the corresponding column of the pixel elements into the digital domain for spatial imaging of the object.

In embodiments, each pixel element can optionally include an amplifier circuit that amplifies the current signal generated by the vertical cavity thyristor device for supply to the corresponding at least one other column line.

In embodiments, the at the least one other column line for each column of pixel elements can be a pair of differential column lines. Alternatively, the at the least one other column line for each column of pixel elements comprises a single column line.

In embodiments, the light source that emits the optical TOF pulse for reflection by the object is integrally formed as part of the optoelectronic integrated circuit; and/or a continuous IR light source that emits infrared light for reflection by the object is integrally formed as part of the optoelectronic integrated circuit.

In embodiments, the pixel elements of the array are formed from an epitaxial layer structure that includes complementary modulation doped quantum well structures. The complementary modulation doped quantum well structures can include an n-type modulation doped quantum well structure formed above a p-type modulation doped structure. The n-type modulation doped quantum well structure can include an n-type charge sheet spaced above one or more quantum wells by at least one undoped spacer layer, and the p-type modulation doped quantum well structure can include a p-type charge sheet spaced below one or more quantum wells by at least one undoped spacer layer. The n-type modulation doped quantum well structure can be spaced above the p-type modulation doped structure by at least one spacer layer.

In embodiments, the vertical cavity thyristor device can employ a resonant cavity for the wavelength of light of the optical TOF pulse that reflects from the object.

BRIEF DESCRIPTION OF THE DRAWINGS

FIG. 4 is a schematic diagram illustrating exemplary layer structures for realizing the integrated circuitry described herein.

FIGS. 5A and 5B, collectively. is a chart illustrating an exemplary layer structure for realizing the integrated circuitry described herein.

DETAILED DESCRIPTION OF THE PREFERRED EMBODIMENTS

Figure 2:
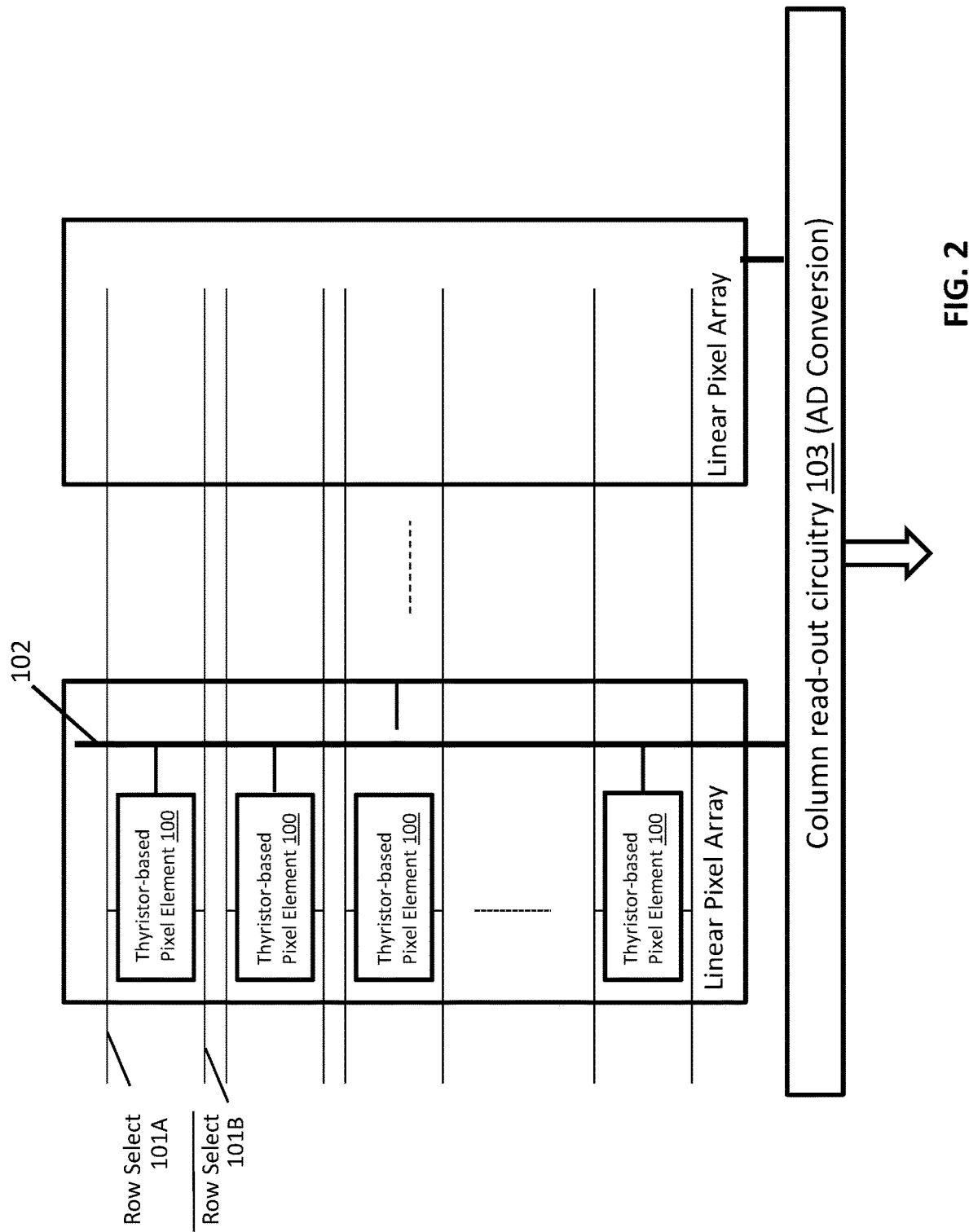
FIG. 2 is a schematic illustration of a LIDAR detector array integrated circuit with thyristor-based pixel elements according to an embodiment of the present disclosure.

Turning now to FIG. 2, a LIDAR detector array integrated circuit is shown that employs thyristor-based pixel elements 100 according to an embodiment of the present disclosure. The thyristor-based pixel elements 100 measure the time-of-flight (TOF) of reflected light pulses to determine distance to an object. The array of thyristor-based pixel elements 100 can be arranged in rows and columns as shown. The thyristor-based pixel elements 100 for each row of the array are electrically coupled to a common pair of row select lines 101A, 101B, which can carry a pair of complementary electrical signals that selectively activate the row of thyristor-based pixel elements 100. The differential outputs of the thyristor-based pixel elements 100 for each column of the array are electrically coupled to a common pair of output lines (referred to as "differential column lines for depth" and labeled 102). In this architecture, the rows of the thyristor-based pixel elements 100 are activated one at a time and the thyristor-based pixel elements 100 of the active row output differential voltage signals on the differential column lines for depth 102, where such differential voltage signals are proportional to the TOF of a detected reflected light pulse to the corresponding differential column lines for depth. Such differential voltage signals can be converted from the analog domain to digital domain by A/D circuitry 103 and follow on processing in the digital domain to determine the TOF of the reflected light pulse and corresponding object depth. Such This process can be repeated over the rows of the thyristor-based pixel elements 100 to provide measurements of the spatial depth of the object. In embodiments, the A/D circuitry 103 and optionally the digital processing that determines the TOF of the reflected light pulse and corresponding object depth can be implemented by electronic circuitry and logic that can be integrally formed as part of the LIDAR detector array integrated circuit.

Figure 3:
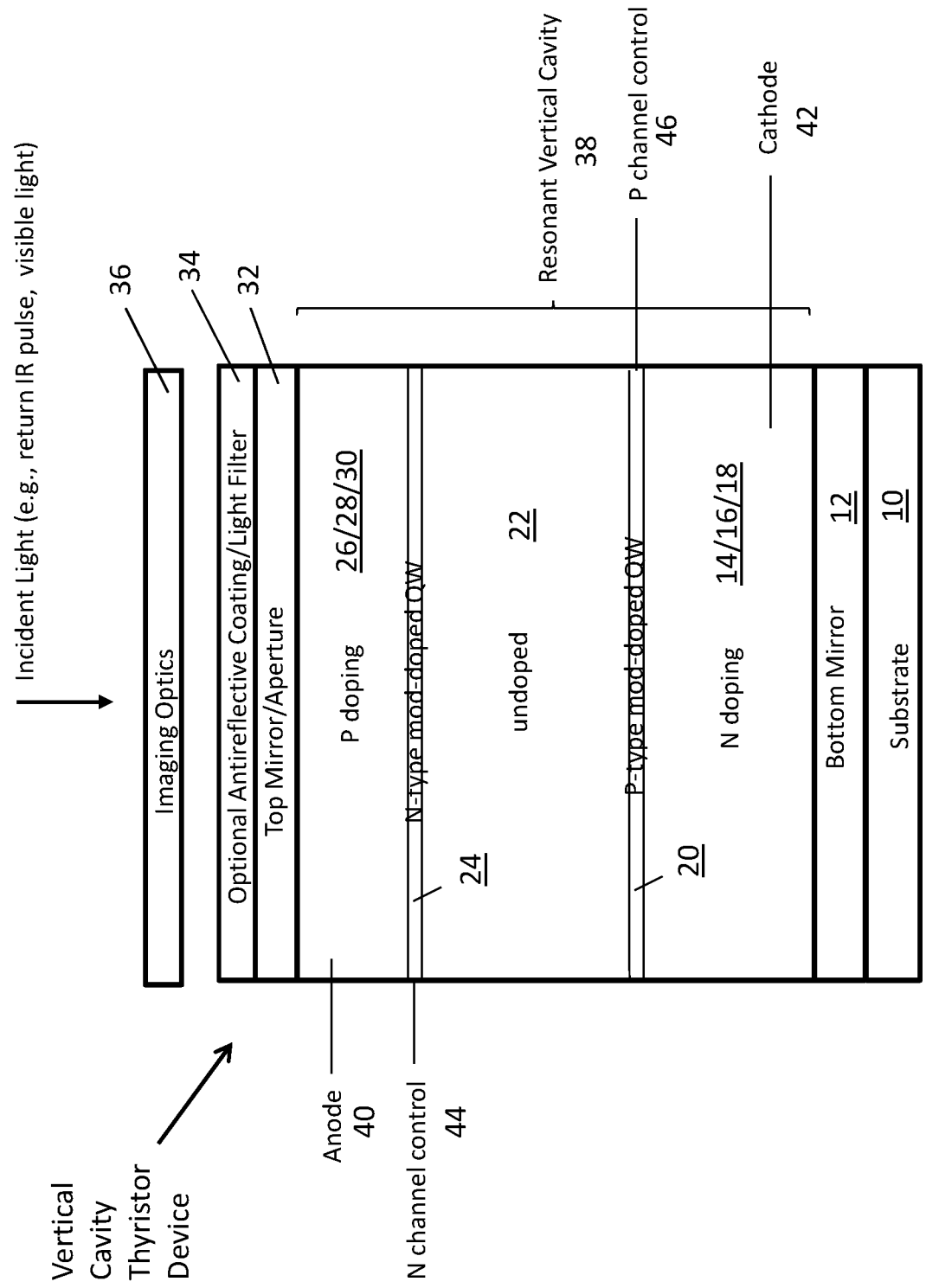
FIG. 3 is a schematic diagram illustrating an exemplary vertical-cavity thyristor device, which can be used as part of the pixel elements of the LIDAR detector array integrated circuitry described herein.

In the LIDAR detector array integrated circuit of FIG. 2, each pixel element 100 includes a vertical cavity thyristor device. For example, FIG. 3 is a schematic cross-section of an exemplary vertical cavity thyristor device. It is a four terminal vertical cavity device which is comprised of a multi-layer epitaxial structure placed between a bottom mirror 12 and a top mirror 32. The mirrors 12, 32 form a resonant vertical cavity 38 in the multi-layer epitaxial structure between the mirrors. Imaging optics 36 that overlie the LIDAR detector array integrated circuit define a field of view and guide incident light arising from the laser light pulses that are reflected by objects in the field of view through the top mirror 32 and into the vertical resonant cavity 38. The mirrors 12, 32 and the dimensions of the resonant vertical cavity 38 are adapted to form a standing wave cavity resonator whose resonance wavelength corresponds to the particular wavelength of the laser light pulses that are reflected by objects in the field of view.

The epitaxial structure of the vertical cavity thyristor device includes two complementary n-type and p-type modulation doped quantum well structures with the n-type modulation doped quantum well structure 24 formed above the p-type modulation doped quantum well structure 30. The n-type modulation doped quantum well structure 24 includes a thin charge sheet heavily doped with n-type dopant spaced above one or more quantum wells by an undoped spacer layer. The p-type modulation doped quantum well structure 20 includes a thin charge sheet heavily doped with p-type dopant below one or more quantum wells by an undoped spacer layer. An undoped intermediate region 22 is disposed between the n-type modulation doped quantum well structure 24 and the p-type modulation doped quantum well structure 20. The n-type modulation doped quantum well structure 24 is disposed between the top p-type region 26 and the undoped intermediate region 22. The p-type modulation doped quantum well structure 20 is disposed between the bottom n-type region 16 and the undoped intermediate region 22. In this manner, the n-type modulation doped quantum well structure 24 is disposed above and spaced from the p-type modulation doped quantum well structure 20. An n-channel control terminal 44 is electrically coupled to the n-type modulation doped quantum well structure 24 and can be used to control the majority electron carrier density in the n-type modulation doped quantum well structure 24. A p-channel control terminal 46 is electrically coupled to the p-type modulation doped quantum well structure 20 and can be used to control the majority hole carrier density in the p-type modulation doped quantum well structure 20.

The vertical cavity thyristor device can be configured in both an OFF state and an ON state. In its ON state, the main current flow of the vertical cavity thyristor device is between the anode terminal 40 and the cathode terminal 42. In its OFF state, the device operates as a resonant cavity detector that absorbs light at the resonant wavelength of the vertical resonant cavity 38. Furthermore, the device can be configured to switch from its OFF state to its ON state due to absorption of sufficient incident light arising from a laser light pulse that is reflected by an object in the field of view of the LIDAR detector array integrated circuit. More particularly, the absorption of such incident light can produce electron-hole pairs that switches the vertical thyristor device into its ON state.

Note that the vertical cavity thyristor device can include an aperture formed over the top mirror 32 as well as optional antireflective coating and light filtering layer(s) 34 formed over the aperture. The antireflective coating can be provided to limit the reflective loss of the incident radiation (which can include a return IR pulse or possibly visible light in support of the color imaging function of the vertical cavity thyristor device as described below with respect to FIG. 11). The light filtering layer(s) can allow for transmission (or pass-thru) of the return IR pulse or possibly transmission (or pass-thru) of certain color components (such as Red, Green or Blue) of visible light in support of the color imaging function of the vertical cavity thyristor device as described below with respect to FIG. 11). In this manner, the light filtering layer(s) can block non-selected color components (such as Green and Blue for a Red pixel element, Red and Blue for a Green pixel element, and Red and Green for a Blue pixel element) of visible light in support of the color imaging function of the vertical cavity thyristor device as described below with respect to FIG. 11). If the color imaging function is not needed, the light filtering layer(s) can block all visible light. The imaging optics 36 can also be provided to focus the incident radiation on the thyristor-based pixel elements 100.

Also note that the top p-type region 26, 28 and the n-type modulation doped quantum well structure 24 of the epitaxial layer structure of the resonant cavity thyristor device can be used to implement an n-type HFET transistor and the bottom n-type region 14, 16, 18 and the p-type modulation doped quantum well structure 20 of the epitaxial layer structure of the resonant cavity thyristor device can be used to implement an inverted p-type HFET as is well known. These complementary HFET transistors along with a capacitor can be integrated with the resonant cavity thyristor device on the substrate and used for the optoelectronic switching functions of the pixel elements of the LIDAR detector array integrated circuit as described herein.

In embodiments, the LIDAR detector array integrated circuit can build upon technology (referred to by the Applicant as "Planar Optoelectronic Technology" or "POET") that provides for the realization of a variety of devices (optoelectronic devices, logic circuits and/or signal processing circuits) utilizing inversion quantum-well channel device structures as described in detail in U.S. Pat. No. 6,031,243; U.S. patent application Ser. No. 09/556,285, filed on Apr. 24, 2000; U.S. patent application Ser. No. 09/798,316, filed on Mar. 2, 2001; International Application No. PCT/US02/06802 filed on Mar. 4, 2002; U.S. patent application Ser. No. 08/949,504, filed on Oct. 14, 1997, U.S. patent application Ser. No. 10/200,967, filed on Jul. 23, 2002; U.S. application Ser. No. 09/710,217, filed on Nov. 10, 2000; U.S. Patent Application No. 60/376,238, filed on Apr. 26, 2002; U.S. patent application Ser. No. 10/323,390, filed on Dec. 19, 2002; U.S. patent application Ser. No. 10/280,892, filed on Oct. 25, 2002; U.S. patent application Ser. No. 10/323,390, filed on Dec. 19, 2002; U.S. patent application Ser. No. 10/323,513, filed on Dec. 19, 2002; U.S. patent application Ser. No. 10/323,389, filed on Dec. 19, 2002; U.S. patent application Ser. No. 10/323,388, filed on Dec. 19, 2002; U.S. patent application Ser. No. 10/340,942, filed on Jan. 13, 2003; U.S. patent application Ser. No. 13/921,311, filed on Jun. 19, 2013; and U.S. patent application Ser. No. 14/222,841, filed on Mar. 24, 2014, and U.S. Pat. No. 9,490,336 filed on Jun. 11, 2015, all of which are hereby incorporated by reference in their entireties.

With these structures, a fabrication sequence can be used to make the devices on a common substrate. In other words, n type and p type contacts, critical etches, etc. can be used to realize all of these devices simultaneously on a common substrate. The essential features of this device structure include 1) an n-type modulation doped interface and a p-type modulation doped quantum well interface, 2) self-aligned n-type and p-type channel contacts formed by ion implantation, 3) n-type metal contacts to the n-type ion implants and the bottom n-type layer structure, and 4) p-type metal contacts to the p-type ion implants and the top p-type layer structure. The active device structures are preferably realized with a material system of group III-V materials (such as a GaAs/AlGaAs).

POET can be used to construct a variety of optoelectronic devices. POET can also be used to construct a variety of high performance transistor devices, such as complementary NHFET and PHFET unipolar devices as well as bipolar inversion channel field-effect transistors (BICFETs) with either an n-type modulation doped quantum well inversion channel base region (n-channel base BICFET) or a p-type modulation doped quantum well inversion channel base region (p-channel base BICFET).

Turning to FIG. 5, POET employs a bottom dielectric distributed Bragg reflector (DBR) mirror 12 that is formed on substrate 10. The bottom DBR mirror 12 is typically formed by depositing pairs of semiconductor or dielectric materials with different refractive indices. When two materials with different refractive indices are placed together to form a junction, light will be reflected at the junction. The amount of light reflected at one such boundary is small. However, if multiple junctions/layer pairs are stacked periodically with each layer having a quarter-wave ($\lambda/4$) optical thickness, the reflections from each of the boundaries will be added in phase to produce a large amount of reflected light (e.g., a large reflection coefficient) at the particular center wavelength $\lambda_C$. Deposited upon the bottom DBR mirror 12 is the active device structure suitable for realizing complementary heterostructure field-effect transistor (HFET) devices.

The first of these complementary HFET devices is a p-channel HFET formed above the bottom DBR mirror layers 12. The p-channel HFET includes a p-type modulation doped quantum well (QW) structure 22 with an n-type gate region (e.g., the layers encompassing the n-type ohmic contact layer 14 and the n-type layer(s) 16)) formed below the p-type modulation doped QW structure 20. The p-type modulation doped QW structure 20 includes a thin P+ doped charge sheet formed below one or more QWs with an undoped spacer layer therebetween. An undoped spacer layer 18 can be disposed between the p-type modulation doped quantum well (QW) structure 20 and the underlying n-type gate region (n-type layer(s) 16).

One or more intermediate spacer layer(s) 22 can be formed above the p-type modulation doped QW structure 20.

The second of these complementary HFET devices is an n-channel HFET formed above the intermediate spacer layer(s) 22. The n-channel HFET includes an n-type modulation doped QW structure 24 with a p-type gate region (e.g., p-type layer(s) 28) formed above the n-type modulation doped QW structure 24. The n-type modulation doped QW structure 24 includes a thin N+ doped charge sheet formed above one or more QWs with an undoped spacer layer therebetween. An undoped spacer layer 26 can be disposed between the n-type modulation doped QW structure 24 and the overlying p-type gate region (p-type layer(s) 28).

The intermediate spacer layer(s) 22 can form the collector (or back-gate) region of the p-channel HFET. Similarly, the intermediate spacer layer(s) 22 can form the collector (or back-gate) region of the n-channel HFET. Such collector (back-gate) regions are analogous to the substrate region of a MOSFET device as is well known. Therefore a non-inverted n-channel HFET device is stacked upon an inverted p-channel HFET device as part of the active device structure.

One or more additional p-type layers can be formed above the gate region (layer(s) 28) of the n-channel HFET. Such additional p-type layer(s) can include one or more p-type ohmic contact layers 30 formed on the p-type layers 28. One or more additional undoped layers (not shown) can be formed above the additional p-type layer(s) as shown.

The bottom n-type layers 14, 16 and the p-type modulation doped QW structure 20 together with the n-type modulation doped QW structure 24 and the top p-type layer(s) 28, 30 define a vertical thyristor (N-P-N-P) device structure. The vertical thyristor (N-P-N-P) device structure can be used to define a vertical cavity thyristor device or electrical thyristor device as needed.

For an n-channel HFET device (or NHFET), the gate region (layer(s) 28) can be exposed by etching away the layers that overlie the gate region, and a gate terminal electrode of the n-channel HFET device is formed on the gate region. A source terminal electrode and a drain terminal electrode of the n-channel HFET device can be operably coupled via n-type ion implanted contact regions to opposite sides of a QW channel(s) realized in the n-type modulation doped QW structure 24. One or more terminal electrodes (not shown) can be operably coupled (for example, via p-type ion implant regions) to the intermediate spacer layer(s) 22 and used as collector (back-gate) terminal electrodes for the n-channel HFET device.

For the p-channel HFET device (or PHFET), the collector (back-gate) region (spacer layer(s) 22) is exposed by etching away the layers that overlie the collector (back-gate) region. A shallow P+ type ion implant contact region can be implanted into the collector (back-gate) region. A collector (back-gate) terminal electrode can be formed on the collector (back-gate) region of the p-channel HFET device. A source terminal electrode and a drain terminal electrode of the p-channel HFET device can be operably coupled via p-type ion implanted contact regions to opposite sides of a QW channel(s) realized in the p-type modulation doped QW structure 20. The bottom n-type ohmic contact layer 14 can be exposed in an area adjacent the gate region of the p-channel HFET device by etching away the layers that overlie the bottom n-type ohmic contact layer 14. A gate electrode can be formed on the bottom n-type ohmic contact layer 14 for contact to the p-channel HFET device.

Both the n-channel HFET device and the p-channel HFET device are field effect transistors where current flows as a two-dimensional gas through a QW channel with contacts at either end. The basic transistor action is the modulation of the QW channel conductance by a modulated electric field that is perpendicular to the QW channel. The modulated electric field modulates the QW channel conductance by controlling an inversion layer (i.e., a two-dimensional electron gas for the n-channel HFET device or a two-dimensional hole gas for the p-channel HFET) as a function of gate voltage relative to source voltage.

For the n-channel HFET device, the QW channel conductance is turned on by biasing the gate terminal electrode and the source terminal electrode at voltages where the P/N junction of the gate and source regions is forward biased with minimal gate conduction and an inversion layer of electron gas is created in the QW channel of the n-type modulation doped QW structure 24 between the source terminal electrode and the drain terminal electrode. In this configuration, the source terminal electrode is the terminal electrode from which the electron carriers enter the QW channel of the n-type modulation doped QW structure 24, the drain terminal electrode is the terminal electrode where the electron carriers leave the device, and the gate terminal electrode is the control terminal for the device.

The p-channel HFET device operates in a similar manner to the n-channel HFET device with the current direction and voltage polarities reversed with respect to those of the n-channel HFET device. For the p-channel HFET device, the QW channel conductance is turned on by biasing the gate terminal electrode and the source terminal electrode at a voltage where the P/N junction of the source and gate regions is forward-biased with minimal gate conduction and an inversion layer of hole gas is created in the QW channel of the p-type modulation doped QW structure 20 between the source terminal electrode and the drain terminal electrode. In this configuration, the source terminal electrode is the terminal from which the hole carriers enter the QW channel of the p-type modulation doped QW structure 20, the drain terminal electrode is the terminal where the hole carriers leave the device, and the gate terminal electrode is the control terminal for the device.

The active device structure can also be configured to realize a variety of electrical and optoelectronic thyristor devices having a vertical P-N-P-N thyristor structure. The upper p-type region (i.e., the first P) of the vertical P-N-P-N thyristor structure is formed by the p-type layers 30, 28 of the active device structure. The upper n-type region (i.e., the first N) of the vertical P-N-P-N thyristor structure is formed from the n-type modulation doped QW structure 24 of the active device structure. The lower p-type region (i.e., the second P) of the vertical P-N-P-N thyristor structure is formed from the p-type modulation doped QW structure 20 of the active device structure. The lower n-type region (i.e., the second N) of the vertical P-N-P-N thyristor structure is formed by the bottom n-type layers 14, 16 of the active device structure.

The device structure of the present application can also be configured to realize optoelectronic devices such as an optical detector. To form a resonant cavity device for optical signal emission and/or detection, a top mirror can be formed over the active device structure described above. The top mirror can be formed by depositing pairs of semiconductor or dielectric materials with different refractive indices.

In one configuration, the resonant cavity of the device can be configured as a vertical cavity and light may enter and exit the vertical cavity through an optical aperture (not shown) in the top surface of the device such that the device operates as a vertical cavity device. In this configuration, the distance between the top mirror and the bottom DBR mirror 12 represents the length of the resonant cavity and can be set to correspond to the designated wavelength (such as 1 to 3 times the designated wavelength). This distance can take into account the penetration depth of the light into the bottom and top mirror. This distance is controlled by adjusting the thickness of one or more of the layers therebetween to enable this condition.

For the vertical cavity thyristor detector device, the device switches from a non-conducting/OFF state (where the current I through the device is substantially zero) to a conducting/ON state (where current I is substantially greater than zero) in response to an input optical signal (e.g., sufficient incident light arising from a laser light pulse that is reflected by an object in the field of view of the LIDAR detector array integrated circuit) that produces charge in the n-type modulation doped QW structure 24 and/or the p-type modulation doped QW structure 20 resulting from photon absorption of the input optical signal. Specifically, the anode terminal electrode can be forward biased with respect to the cathode terminal electrode and the voltage between n-channel injector and the anode electrode (and/or the voltage between the p-channel injector and the cathode terminal electrode) can be biased such that that charged produced in the n-type modulation doped QW structure 24 (and/or the p-type modulation doped QW structure 20) resulting from photon absorption of the input optical pulse is greater than the critical switching charge QCR. When the input optical signal is removed (e.g., the laser light pulse terminates and there is insufficient incident light reflected by the object in the field of view of the LIDAR detector array integrated circuit), the device switches from the conducting/ON state (where the current I is substantially greater than zero) to a non-conducting/OFF state (where current I is substantially zero) when the charge in the n-type modulation doped QW structure 24 (and/or the p-type modulation doped QW structure 20) decreases below the holding charge QH.

FIGS. 5A and 5B, collectively, illustrate an exemplary layer structure utilizing group III-V materials for realizing the device structure of FIG. 4 as described herein. The layer structure of FIGS. 5A and 5B can be made, for example, using known molecular beam epitaxy (MBE) techniques. Starting from FIG. 5B, a semiconductor layer 103 of aluminum arsenide (AlAs) and a semiconductor layer 105 of gallium arsenide (GaAs) are alternately deposited upon a semi-insulating GaAs substrate 101 in sequence to form the bottom DBR mirror layers. The number of AlAs layers 103 will preferably always be one greater than the number of GaAs layers 105 so that the last layer of the bottom DBR mirror layers is shown as AlAs layer 107. In the preferred embodiment, the bottom mirror layers can be grown as alternating layers of one-quarter wavelength thickness of GaAs and AlAs. In this case, many pairs are required (with typical numbers such as 27.5 pairs for 980 nm wavelength) to achieve the reflectivity needed for efficient optical functions. Alternatively, the AlAs layers 103 can be subjected to high temperature steam oxidation during fabrication to produce the compound $Al_xO_y$ so that a mirror will be formed at the designed center wavelength. This center wavelength is selected such that all of the desired resonant wavelengths for the device structures will be subject to high reflectivity. In one embodiment, the thicknesses of layers 103 and 105 in the DBR mirror can be chosen so that the final optical thickness of GaAs and $Al_xO_y$ are one quarter wavelength of the center wavelength $\lambda_C$. The layers 103, 105 and 107 correspond to the bottom DBR mirror 12 of FIG. 4 as described above. The substrate 101 corresponds to the substrate 10 of FIG. 4 as described above.

Deposited on the last bottom mirror layer 107 is an undoped GaAs layer 109. Layer 109 has a typical thickness of 200 Å.

Deposited on layer 109 is the active device structure which begins with layer 111 of N+ type GaAs that enables the formation of ohmic contacts thereto. Layer 111 has a typical thickness near 2881 Å and a typical n-type doping of $3.5 \times 10^{18}$ cm$^{-3}$. The N+ doped GaAs layer 111 corresponds to the bottom n-type ohmic contact layer 12 of FIG. 4 as described above.

Deposited on layer 111 are four layers (113, 115, 117, 119) comprising a stack of an alternating materials comprising an alloy of AlGaAs and GaAs. These four layers are doped N+ with a typical n-type doping of $3.5 \times 10^{18}$ cm$^{-3}$. The first layer 113 is an alloy of $Al_{x1}Ga_{(1-x1)}As$ where the parameter x1 is preferably 70% and with a typical thickness of 1000 Å. The second layer 115 is GaAs with a typical thickness of 12 Å. The third layer 117 is an alloy of $Al_{x2}Ga_{(1-x2)}As$ where the parameter x2 is preferably 15% and with a typical thickness of 20 Å. The fourth layer 119 is GaAs with a typical thickness of 12 Å. The stack of layers 113, 115, 117, 119 functions electrically as part of the gate region of the p-channel HFET and the bottom n-type regions of the vertical thyristor device and optically provides lower waveguide cladding and optical confinement.

Next is layer 121 of an alloy of $Al_{x2}Ga_{(1-x2)}As$ where the parameter x2 is preferably 15% and with a typical thickness of 80 Å. Layer 121 forms the bottom plate of a capacitor (layers 121, 123, 131) that defines the input capacitance of the gate region of the p-channel HFET. Layer 121 can incorporate N+ doping of $3.5 \times 10^{18}$ cm$^{-3}$, which should be sufficient to limit the penetration of the capacitor spacer layer 123 by depletion into layer 121. The n-type layers 113, 115, 117, 119, and 121 correspond to the n-type layer(s) 18 of FIG. 5.

Next is an undoped spacer layer 123 formed from an alloy of $Al_{x2}Ga_{(1-x2)}As$ where the parameter x2 is preferably 15% and with a typical thickness of 300 Å. The undoped AlGaAs layer 123 corresponds to the spacer layer(s) 18 of FIG. 4 as described above.

Next is a thin p-type charge sheet 125 formed from an alloy of $Al_{x2}Ga_{(1-x2)}As$ where the parameter x2 is preferably 15%. Layer 125 is doped P+ with a typical p-type doping of $7 \times 10^{18}$ cm$^{-3}$ and has a typical thickness of 25 Å. The charge sheet 125 functions as the p-type modulation doped layer for the inverted p-type modulation doped quantum structure 20 formed thereabove.

Next is an undoped spacer layer 127 formed from an alloy of $Al_{x2}Ga_{(1-x2)}As$ where the parameter x2 is preferably 15%. Layer 127 has a typical thickness of 60 Å. Next is an undoped layer 129 of GaAs having a typical thickness of 15 Å.

Next, an undoped InGaAs QW layer 131 and an undoped GaAs barrier layer 133 are repeated for a number of quantum wells (such as three or more quantum wells) for the inverted p-type modulation doped quantum structure 20. Single quantum well structures may also be used. The undoped InGaAs QW layer 131 is formed from an alloy of $In_{x1}Ga_{(1-x1)}As$, where the parameter x1 is preferably 20%. Layer 131 has a typical thickness of 60 Å. The GaAs barrier 133 has a typical thickness of 100 Å.

Next is an undoped GaAs barrier layer 135 having a typical thickness of 400 Å. Layers 125 to 133 correspond to the inverted p-type modulation doped quantum structure 20 of FIG. 4 as described above.

A series of three undoped spacer layers 137, 139, 141 follows the barrier layer 135. Layer 137 is formed from an alloy of $Al_{x2}Ga_{(1-x2)}As$, where the parameter x2 is preferably 15% and has a typical thickness of 2170 Å. Layer 139 is formed from GaAs and has a typical thickness of 20 Å.

Layer 141 is formed from an alloy of $Al_{x2}Ga_{(1-x2)}As$, where the parameter x2 is preferably 15% and has a typical thickness of 2170 Å. Layers 137, 139, 141 correspond to the undoped spacer layer(s) 22 of FIG. 4 as described above.

Following spacer layer 141 is an undoped GaAs layer 143 with a thickness on the order of 400 Å. Next is an undoped GaAs barrier layer 145 and an undoped InGaAs QW layer 147 that are repeated for a number of quantum wells (such as three or more quantum wells) for the n-type modulation doped quantum structure 24. Single quantum well structures may also be used. The GaAs barrier layer 145 has a typical thickness of 100 Å. The undoped InGaAs QW layer 147 is formed from an alloy of $In_{x1}Ga_{(1-x1)}As$, where the parameter x1 is preferably 20%. Layer 147 has a typical thickness of 60 Å.

Next is an undoped GaAs spacer layer 149 with a typical thickness of 15 Å followed by an undoped AlGaAs spacer layer 151 with a typical thickness of 30 Å. The AlGaAs spacer layer 151 is formed from an alloy of $Al_{x2}Ga_{(1-x2)}As$, where the parameter x2 is preferably 15%. Next is a thin n-type charge sheet 153 formed from an alloy of $Al_{x2}Ga_{(1-x2)}As$, where the parameters x2 is preferably 15%. Layer 153 is doped N+ with a typical n-type doping of $3.5 \times 10^{18}$ cm$^{-3}$ and has a typical thickness of 80 Å. The charge sheet 153 functions as the n-type modulation doped layer for the n-type modulation doped quantum structure 20 formed therebelow. The layers 143 to 153 corresponds to the n-type modulation doped QW structure 24 of FIG. 4 as described above.

Next is an undoped spacer layer 155 formed from an alloy of $Al_{x2}Ga_{(1-x2)}As$, where the parameter x2 is preferably 15%. Layer 155 has a typical thickness of 300 Å. The undoped AlGaAs layer 155 corresponds to the spacer layer(s) 26 of FIG. 4 as described above.

Next is a layer 157 of an alloy of $Al_{x2}Ga_{(1-x2)}As$ where the parameters x2 is preferably 15%. The layer 157 is P+ doped with a typical p-type doping of $7 \times 10^{18}$ cm$^{-3}$ and has a typical thickness of 80 Å. Layer 157 forms the top plate of a capacitor (layers 147, 155, 157) that defines the input capacitance of the gate region of the n-channel HFET. Layer 157 can incorporate sufficient P+ doping to limit the penetration of the capacitor spacer layer 155 by depletion into layer 157.

Next is layer 159 of GaAs that is P+ doped with a typical p-type doping of $7 \times 10^{18}$ cm$^{-3}$ and has a typical thickness of 12 Å. Next are three layers 161, 163 and 165 that are formed from an alloy of $Al_{x1}Ga_{(1-x1)}As$ where the parameter x1 is preferably 70%. Layer 161 is P+ doped with a typical p-type doping of $7 \times 10^{18}$ cm$^{-3}$ and has a typical thickness of 10 Å. Layer 163 is P doped with a typical p-type doping of $5 \times 10^{17}$ cm$^{-3}$ and has a typical thickness of 960 Å. Layer 165 is P+ doped with a typical p-type doping of $7 \times 10^{18}$ cm$^{-3}$ and has a typical thickness of 10 Å. The AlGaAs material of layers 161, 163 and 165 serve optically as upper waveguide cladding and optical confinement of the respective optical device. Layers 157 to 167 correspond to the p-type layer(s) 28 of FIG. 4 as described above.

Next is layers 167, 169 and 171 of P+ doped GaAs. Layer 167 has a typical p-type doping of $7 \times 10^{18}$ cm$^{-3}$ and a typical thickness near 6 Å. Layer 169 has a typical p-type doping of $7 \times 10^{18}$ cm$^{-3}$ and a typical thickness near 658 Å. Layer 171 has a typical p-type doping of $1 \times 10^{20}$ cm$^{-3}$ and a typical thickness near 600 Å. The P+ doped GaAs layers 167, 169, 171 corresponds to the top p-type ohmic contact layer(s) 30 of FIG. 4 as described above.

Deposited on layer 171 is layer 173 of undoped GaAs with a typical thickness of 300 Å or more. Layer 173 can be used to form an aperture for optical devices (such as the vertical cavity thyristor devices described herein).

Figure 6:
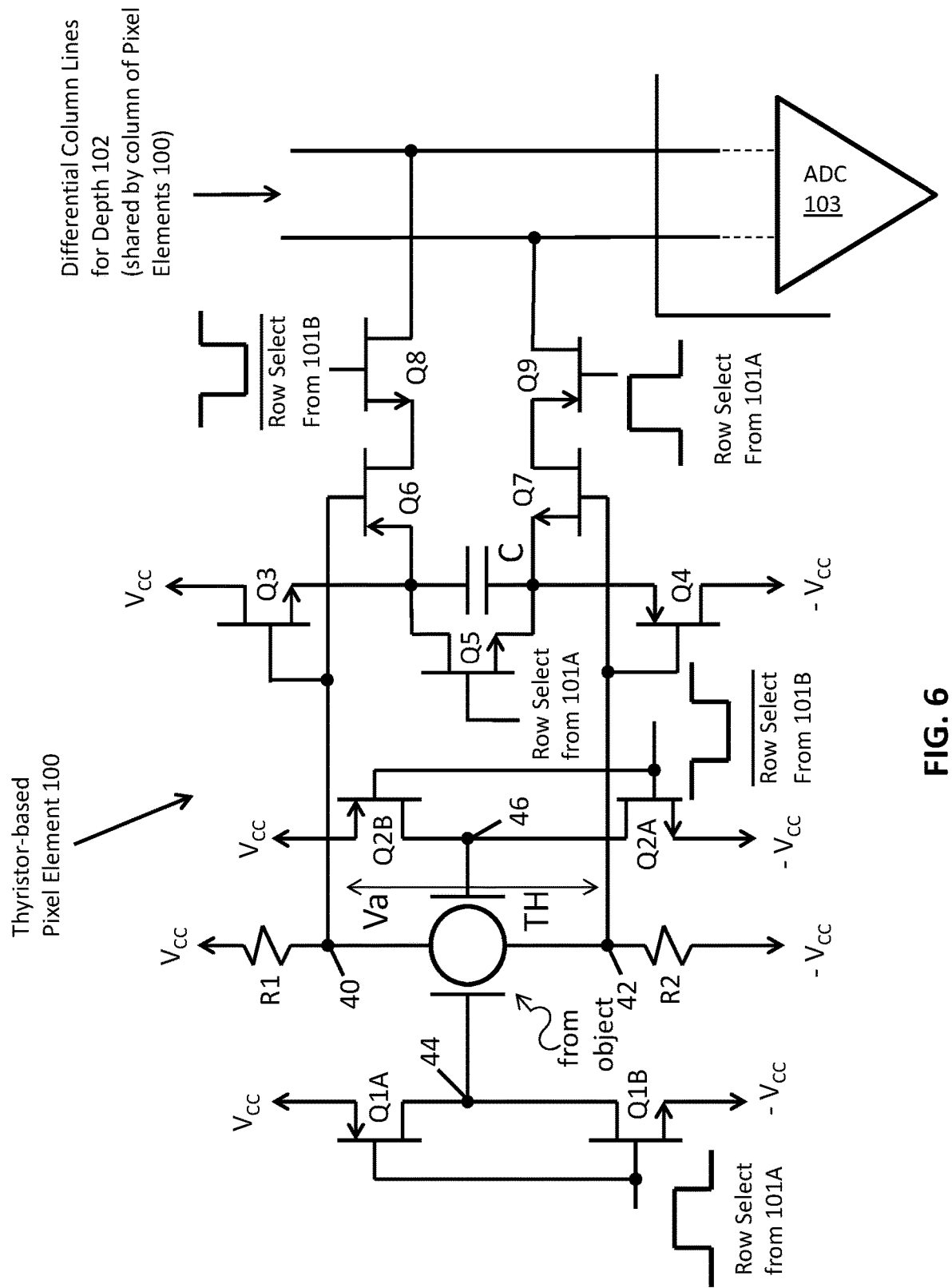
FIG. 6 is a circuit diagram of an exemplary thyristor-based pixel element for use as part of the LIDAR detector array integrated circuit of FIG. 2. The components and interconnections of the thyristor-based pixel element can be integrally formed with one another as part a LIDAR detector array integrated circuit. In this embodiment, the imaging cycles (and corresponding imaging operations) performed by each thyristor-based pixel element include a TOF detection period where the vertical cavity thyristor device is configured to terminate the charging of a capacitor upon receiving a TOF return pulse and to automatically output the voltage stored by the capacitor to corresponding column lines (referred to as "column lines for depth") for analog-to-digital conversion.
Figure 9:
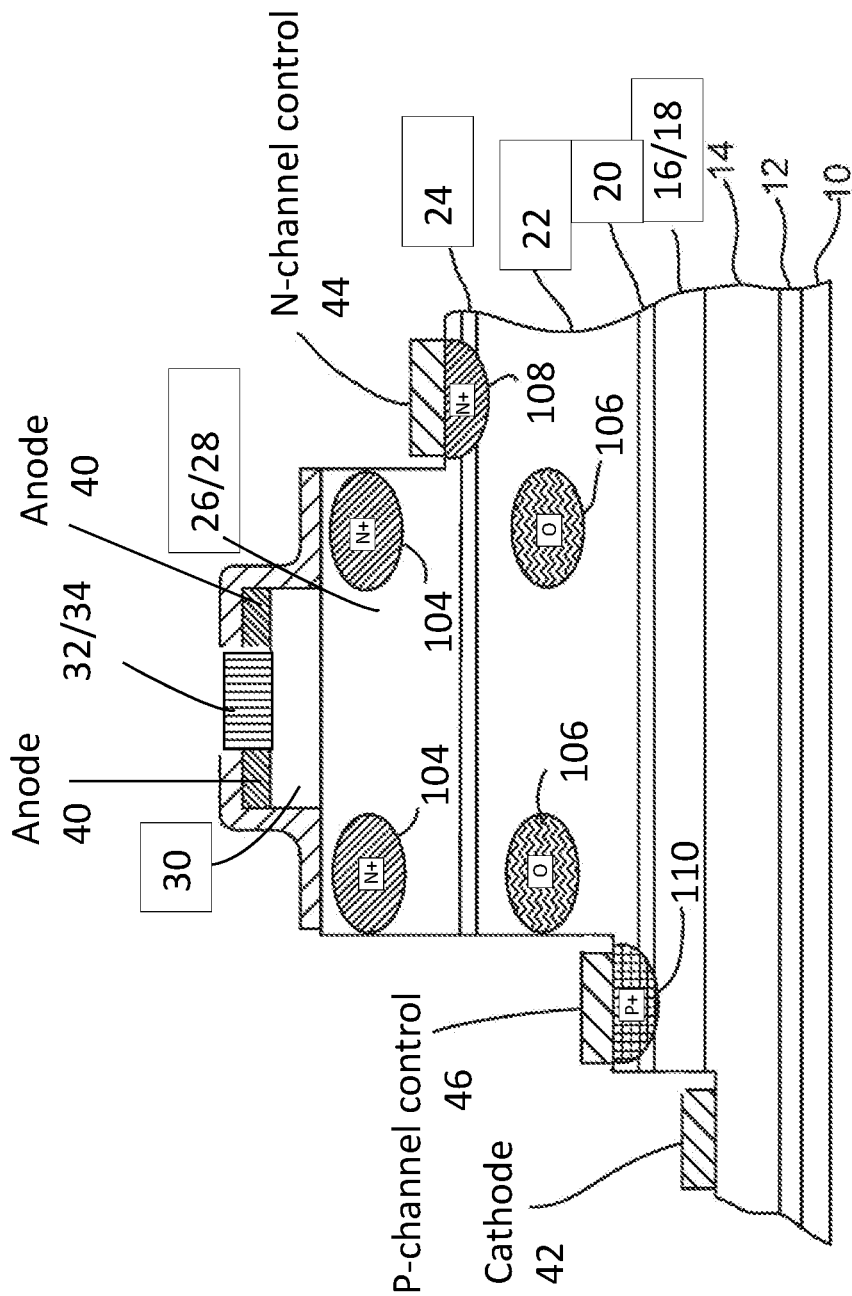
FIG. 9 is a cross-section schematic diagram illustrating an exemplary vertical cavity thyristor device formed in the layer structure of FIG. 4, which can be used as part of the pixel element of the LIDAR detector array integrated circuitry described herein.
Figure 10:
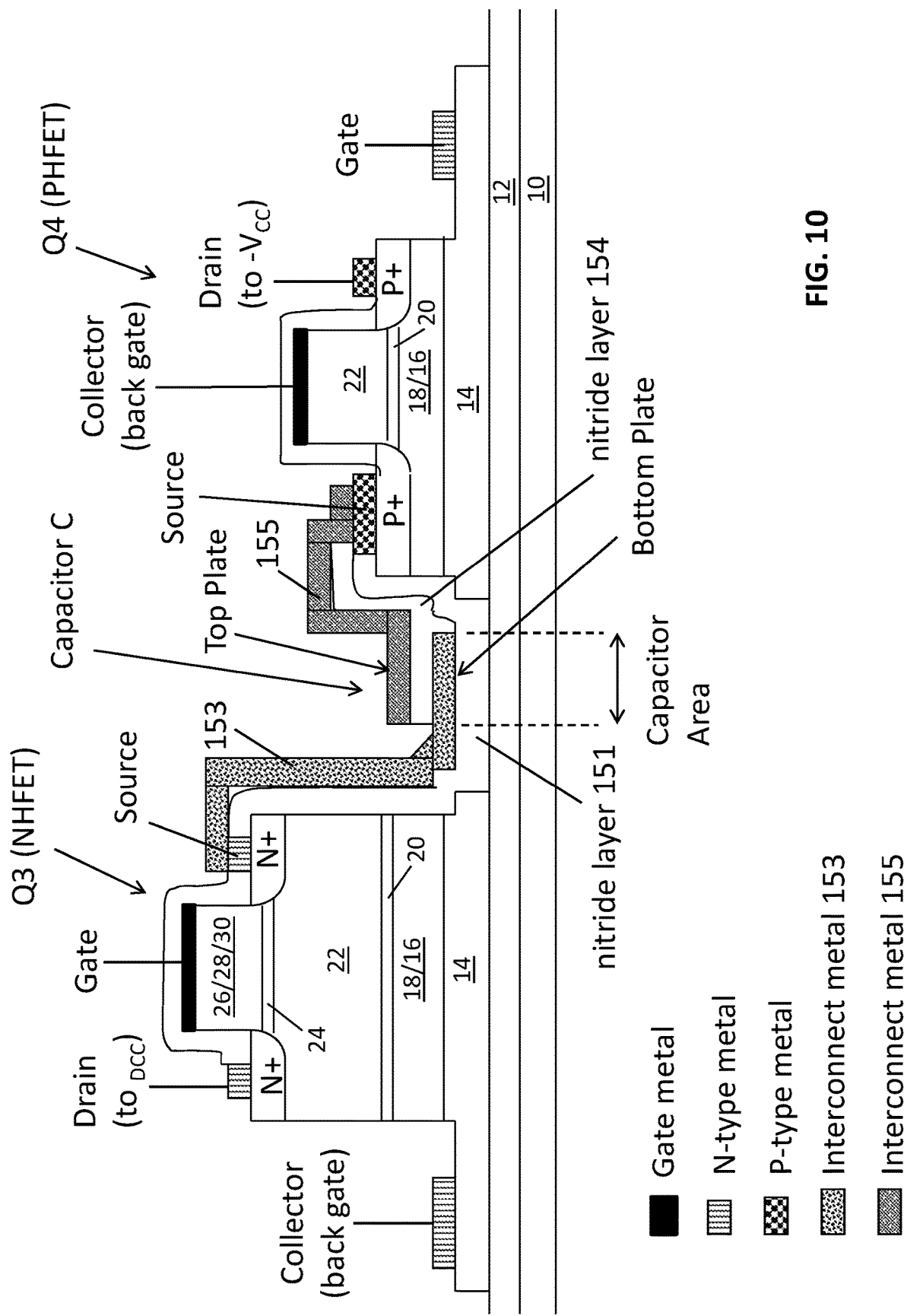
FIG. 10 is a cross-section schematic diagram illustrating an exemplary arrangement of complementary HFET transistors that are coupled to a charging capacitor, where the components are formed in the layer structure of FIG. 4 and can be used as part of the pixel element of the LIDAR detector array integrated circuitry described herein.

FIG. 6 shows an exemplary embodiment of the thyristor-based pixel element 100 of the LIDAR detector array integrated circuit as described herein, which includes a vertical cavity thyristor device (labeled "TH"), a capacitor (labeled "C") and several HFETs (including NHFETs Q1B, Q2A, Q3, Q5, Q7, Q8 and PHFETs Q1A, Q2B, Q4, Q6, Q9) to perform electronic switching functions. The load resistors R1 and R2 can also be active loads implemented as HFETs. The vertical cavity thyristor device TH, the capacitor C and the HFETs of the pixel element can be realized in the same integrated circuit platform (FIGS. 9 and 10). The vertical cavity thyristor device TH enables a simplified implementation of the sensor pixel that eliminates the need to solve multiple equations to determine TOF and corresponding depth. Instead, the thyristor-based pixel element makes a single measurement of TOF represented as a voltage signal which can be fed directly to the ADC circuitry 103. This voltage signal can be sized for the ADC circuitry 103 by choosing the power supply voltage levels appropriately. Therefore, only a single detection cycle per pixel element is required.

The TOF information for each thyristor-based pixel element of the detector array is determined by the switching action of the vertical cavity thyristor device as activated by a return light pulse (or TOF return pulse). The waveforms for this operation are shown in FIGS. 7A-7C. The pixel elements 100 (one shown in FIG. 6) for a given row of the detector array are activated by supplying a $t_{source}$ electrical pulse signal to the illumination source to emit an outgoing laser (optical) pulse at t=0 (or by receiving the $t_{source}$ electrical pulse signal from the illumination source) as shown in FIG. 7A. Complementary electrical row select signals (including Row Select and its complement "RowSelect"), which are electrical activation pulses that are synchronous to the $t_{source}$ pulse signal, are applied to the pixel elements for the given row. In this manner, each pixel element of the given row receives a row select pulse at or near t=0 as shown in FIG. 7B as well as a complement row select pulse at or near t=0.

In response to the receipt of the given row select pulse and complementary row select pulse at the pixel element, the source-drain current paths of the HFETs Q8 and 9 are switched OFF for the duration of the row select pulse and then switched ON at the termination of the row select pulse. These operations isolate the column lines for depth 102A from the pixel element. Furthermore, the source-drain current path through HFET Q5 turns ON for the duration of the row select pulse and then turns OFF at the termination of the row select pulse. With the source-drain current path through NHFET Q5 ON, any charge stored on the capacitor C from the previous detection cycle can be emptied through the resistance of the channel of NHFET Q5. In this manner, the charge storage state of the capacitor C can be reset in response to the row select pulse. In alternate embodiments, a PHFET can be used in place of the NHFET Q5. In this case, the complement row select signal can be supplied to the PHFET such that the source-drain current path through the PHFET turns ON for the duration of the row select pulse and then turns OFF at the termination of the row select pulse in order to empty any charge stored on the capacitor C through resistance of the channel of the PHFET.

Furthermore, HFETs Q1A, Q1B, Q2A and Q2B can be configured to switch the vertical cavity thyristor device TH into its ON state for the duration of the row select pulse (and the complement row select pulse) and then switch the vertical cavity thyristor device TH into its OFF state at the termination of the row select pulse (and the complementary row select pulse). Note the source-drain current path of PHFET Q1A is electrically coupled between the positive voltage $V_{CC}$ and the n-channel control electrode 44 of the vertical cavity thyristor device TH, while the source-drain current path of NHFET Q1B is electrically coupled between the negative voltage $-V_{CC}$ and the n-channel control electrode 44 of the vertical cavity thyristor device TH. The gates of both PHFET Q1A and NHFET Q1B are driven by the row select signal. Similarly, the source-drain current path of PHFET Q2B is electrically coupled between the positive voltage $V_{CC}$ and the p-channel control electrode 46 of the vertical cavity thyristor device TH, while the source-drain current path of NHFET Q2A is electrically coupled between the negative voltage $-V_{CC}$ and the p-channel control electrode 46 of the vertical cavity thyristor device TH. The gates of both PHFET Q2B and NHFET Q2A are driven by the complement row select signal. In this configuration, NHFET Q1B supplies electrons to the n-channel control electrode 44 while PHFET Q2B supplies holes to the p-channel control electrode 46 during the duration of the row select pulse in order to switch the vertical cavity thyristor device TH into its ON state for the duration of the row select pulse. PHFET Q1A drains electrons from the n-channel control electrode 44 while NHFET Q2A drains holes from the p-channel control electrode 46 when the row select pulse is terminated in order to switch the vertical cavity thyristor device TH into its OFF state at the termination of the row select pulse.

With the vertical cavity thyristor device TH switched into its ON state for the duration of the row select pulse, the source-drain current paths of HFETs Q3 and Q4 are switched OFF by the gate voltages applied by the voltage levels at the anode terminal 40 and the cathode terminal 42, respectively.

Note that the source-drain current paths of HFETs Q6 and Q7 can be switched ON with the vertical cavity thyristor device TH in its ON state for the duration of the row select pulse (and the complement row select pulse). In embodiments, the HFETs Q8 and Q9 can be configured to switch OFF before the HFETs Q6 and Q7 are switched ON by the switching action of the thyristor device TH into its ON state. This isolates the column lines 102 from the pixel element 100 during the initiation and duration of the reset pulse (including when the HFETs Q6 and Q7 are switched ON and charge is emptied from the capacitor C by the action of HFET Q5). Such operations can be accomplished by adjusting the size and switching speeds of the HFETs Q6, Q7, Q8 and Q9.

At the termination of the row select pulse (and the complement row select pulse), the source-drain current paths of HFETs Q8 and Q9 are switched ON and the vertical cavity thyristor device TH is switched into its OFF state. The switching of the vertical cavity thyristor device TH into its OFF state causes the source-drain current paths of HFETs Q6 and Q7 to be switched OFF by the gate voltages applied by the voltage levels at the anode terminal 40 and the cathode terminal 42, respectively. This operation isolates the column lines 102 from the pixel element until the vertical cavity thyristor device TH is switched ON due to the TOF return pulse as described below). In embodiments, the HFETs Q8 and Q9 can be configured to switch ON after the HFETs Q6 and Q7 are switched OFF by the switching action of the thyristor device TH into its OFF state. This isolates the column lines 102 from the pixel element 100 at the termination of the reset pulse. Such operation can be accomplished by adjusting the fall time on the reset pulse (or the rise time on the complement reset pulse).

Furthermore, the switching of the vertical cavity thyristor device TH into its OFF state also causes the source-drain current paths of HFET transistors Q3 and Q4 to be switched ON by the gate voltages applied by the voltage levels at the anode terminal 40 and the cathode terminal 42, respectively. With the source-drain current paths of HFET transistors Q3 and Q4 switched ON, the charging of the capacitor C of the given pixel element is initiated by current flowing through the source-drain current paths of the HFET transistors Q3 and Q4. In embodiments, the size and resulting switching speeds of the HFETs can be configured such that the column lines 102 are always isolated from the pixel element 100 during when reset pulse when the HFETs Q3 and Q4 are switched ON and start charging the capacitor C.

The capacitor C functions to integrate the charge that is supplied thereto by the active source-drain current paths of the HFETs Q3 and Q4 while the vertical cavity thyristor device TH is in its OFF state. Note the size of the HFETs Q3 and Q4 can be selected to achieve the desired charge state of capacitor C during the time that the TOF light pulse is in transit, while the size of HFET Q5 can be selected to ensure complete discharge during the reset pulse.

The light reflected from an object in the field of view is a TOF return pulse as shown in FIG. 7C. The TOF return pulse switches the vertical cavity thyristor device from its OFF state into its ON state. The voltage across the vertical cavity thyristor device is labeled $V_a$ and shown in FIG. 7C. This switching action of the vertical cavity thyristor device from its OFF to ON state is used to interrupt the charge integration function performed by the capacitor C thereby determining the final voltage $V_{meas}$ that is output to the column lines 102 for supply to the ADC circuitry 103. The time for this switching is between the minimum depth and the maximum depth of the object as shown in FIG. 7C.

In embodiments, the switching operation of the vertical cavity thyristor device TH from its OFF state to ON state is configured to switch OFF the source-drain current paths of HFETs Q3 and Q4 and switch ON the source-drain current paths of HFETs Q6 and Q7 such that they couple the terminals of the charging capacitor C to the differential column lines 102 and ADC circuitry 103 of the column of the detector array. In this manner, the switching operation of the vertical cavity thyristor device TH interrupts the charge integration function of the capacitor C such that the capacitor C generates a measured voltage signal that corresponds to the TOF of the returned light pulse and simultaneously transfers this measured voltage signal from the capacitor C to the column lines 102 and the ADC circuitry 103 of the column. Specifically, when the vertical cavity thyristor device switches from its OFF state to ON state due absorption of the return light pulse, the source-drain current paths of HFETs Q3 and Q4 are switched OFF to interrupt the charge integration function of the capacitor C such that the capacitor C generates a measured voltage signal that corresponds to the TOF of the returned light pulse. Simultaneously, the source-drain current paths through HFETs Q6 and Q7 are turned ON such the top and bottom terminals of the charging capacitor C are electrically connected by the active source-drain current paths of the HFETs Q8 and Q9 to the differential column lines 102 and the ADC circuitry 103 of the column of the detector array. In this configuration, the measured voltage signal stored on the charging capacitor C, which corresponds to the TOF of the returned light pulse, is read out from the pixel element 100 and transferred to the ADC circuitry 103 for the column of detector array when the vertical cavity thyristor device TH switches from its OFF state to ON state due absorption of the return light pulse. There is one ADC circuitry 103 per column of the detector array and it is coupled to the differential column lines 102 shared by the column of pixel elements 100 of the detector array.

Figure 8:
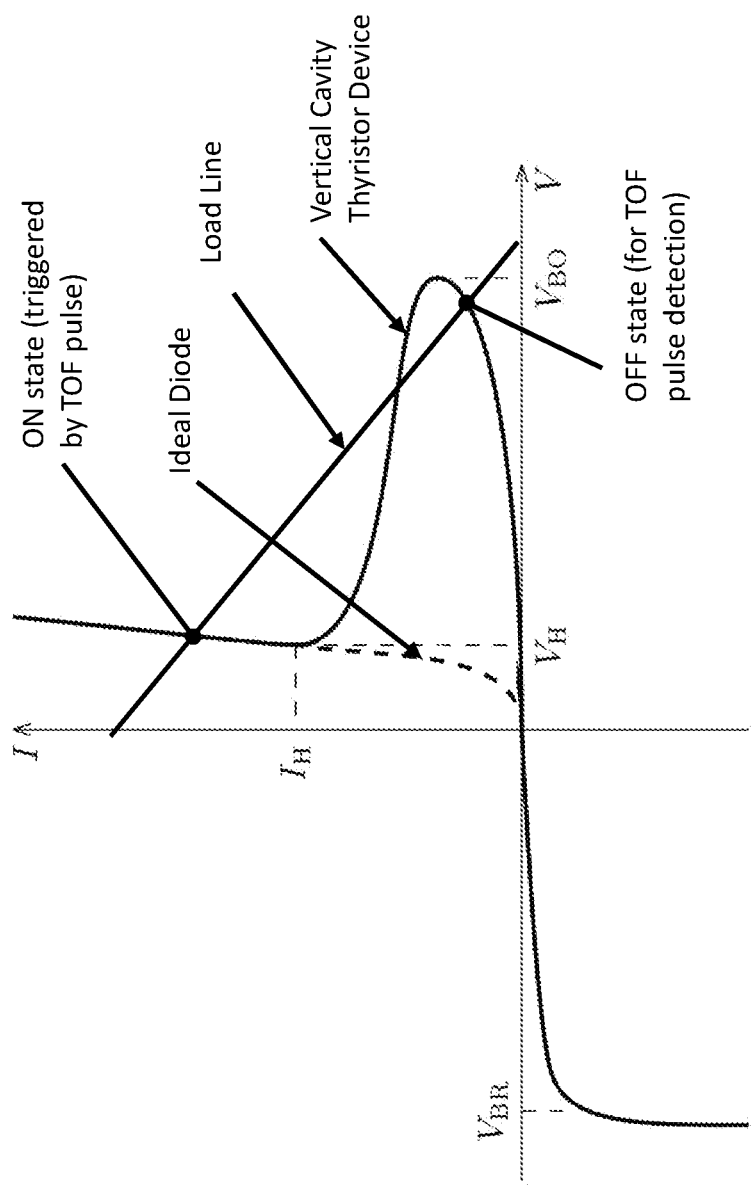
FIG. 8 is a current-voltage curve that describes the operational characteristics of the vertical cavity thyristor device of the pixel element of FIG. 6.

Exemplary OFF and ON states of an illustrative vertical cavity thyristor device TH is shown in FIG. 8. The current-voltage curve of the illustrative vertical cavity thyristor device TH can be shifted by controlling the current applied to the n-channel control electrode 44 and/or the p-channel control electrode 46 in the OFF state of the thyristor device TH. Furthermore, the location of the OFF state along the current-voltage curve can be set by the load line according to the resistance values of the active loads R1 and R2. In embodiments, the current voltage curve and/or location of the OFF state can be configured based on desired sensitivity and noise rejection characteristics (which can account for ambient light conditions). For example, shifting the current-voltage curve of the thyristor device toward the ideal diode curve can reduce the optical threshold needed to switch the vertical cavity thyristor device TH into its ON state and thus increase the sensitivity of the device and lessen noise rejection, while shifting the current-voltage curve of the thyristor device away from the ideal diode curve can increase the optical threshold needed to switch the vertical cavity thyristor device TH into its ON state and thus decrease the sensitivity of the device and increase noise rejection In yet another example, setting the location of the OFF state closer to the switching voltage (labeled $V_{BO}$) can reduce the optical threshold needed to switch the vertical cavity thyristor device TH into its ON state and thus increase the sensitivity of the device and lessen noise rejection, while setting the location of the OFF state further from the switching voltage (labeled $V_{BO}$) can increase the optical threshold needed to switch the vertical cavity thyristor device TH into its ON state and thus decrease the sensitivity of the device and increase noise rejection. In other embodiments, the power supply values (e.g., $V_{CC}$ and $-V_{CC}$) can be adjusted based on desired sensitivity and noise rejection characteristics (which can account for ambient light conditions).

Note that there is a 1:1 correlation between voltage and TOF (and corresponding depth (z), which is determined by the RC time constant of the capacitor charging circuit. This RC time constant is dictated primarily by the ON resistance of the HFETs Q3, Q4 and the capacitance of the charging capacitor C. This is fairly simply expressed for the pixel circuit of FIG. 6 as:

$$\text{depth}(z) = \frac{c}{2} R_{Q3,Q4} C \ln\left(\frac{V_{CC}}{V_{CC} - V_{meas}}\right) = K \ln\left(\frac{V_{CC}}{V_{CC} - V_{meas}}\right) \quad \text{Eq. (1)}$$

where c is the speed of light and given as $3 \times 10^{18}$ cm/s,
$R_{Q3,Q4}$ is the series equivalent source-drain resistance (in ohms) of the HFETS Q3 and Q4,
C is the capacitance (in farads) of the capacitor C,
$V_{cc}$ is the positive voltage supply level (in Volts) of the positive voltage supply, and
$V_{meas}$ is the voltage level (in Volts) output from the capacitor C when the TOF return pulse is detected and measured by the ADC circuitry.

The proportionality constant K of the pixel element can be determined by an initial calibration procedure in which the voltage vs time characteristic of the pixel elements can be established and stored. This value can possibly vary slightly from pixel to pixel element depending upon fabrication and material variations in the defined capacitance and the HFET current. Another calibration procedure can be used to correct for the effects of incident ambient light by using the adjustability of the HFETs Q1A, Q1B, Q2A, Q2B of the pixel circuit. Specifically, the gate input voltages applied to the HFETs Q1A, Q1B, Q2A, Q2B with the vertical cavity thyristor device TH in its OFF state can be adjusted to increase the optical threshold for switching, which will prevent the vertical cavity thyristor device TH from switching with ambient light. An alternative correction procedure can be used to adjust the power supply voltages (e.g., $V_{CC}$ and $-V_{CC}$) to reduce the sensitivity to ambient light. This calibration procedure can be initiated internally to the circuit and is run in the ambient light before the launch pulse ($t_{source}$ pulse signal) and corresponding row select signal is supplied to one or more rows of the detector array.

Note that multiple waveforms are not required to reset the capacitor charge so the next launch pulse ($t_{source}$ and row select pulse) starts the process to acquire a new data point. Also note that the $t_{source}$ pulse and corresponding row select signals simultaneously activate the illumination source and returns the vertical cavity thyristor devices for the row of pixel elements to the OFF state so the capacitor charging process can begin for the capacitors C of the row of pixel elements. Note if there are N rows of pixel elements in the detector array integrated circuit, then the illumination source is pulsed N times for all N rows to obtain a full depth image.

FIG. 9 is a cross-section schematic diagram illustrating an exemplary vertical cavity thyristor device formed in the layer structure of FIG. 4, which can be used as part of the pixel element of the LIDAR detector array integrated circuitry described herein. The vertical cavity thyristor device is defined by a top aperture (not shown) that encompasses the anode terminal metal 40 and the top DBR mirror layers that are subsequently formed. Oxygen ions 106 and then n-type dopant ions 104 (e.g., SiF ions) are implanted into the layer structure on opposite sides of (or surrounding) the top aperture. The oxygen ions 106 are implanted to a depth centered at or near the intermediate spacer layer(s) 20. The n-type dopant ions 104 (e.g., SiF ions) are implanted to a depth centered at or near the top n-type region of layers 26, 28 as shown.

One or more metal layers are deposited and patterned on the top aperture to form the anode terminal 40. In one embodiment, this metal layer(s) can be formed from tungsten (W) or from a combination of tungsten (95%) and indium (5%). The metal layer tungsten (W) and indium (In) can be formed by co-sputtering of tungsten and indium or other suitable means.

One or more first mesas as well as one or more sidewalls leading to such first mesa(s) are defined by etching to form contact regions to the n-type modulation doped QW structure 24 for the vertical cavity thyristor device. N-type ions 108 are implanted through the first mesa(s) into the resultant structure for contact to the n-type modulation doped QW structure 24 of the vertical cavity thyristor device.

One or more second mesas as well as one or more sidewalls leading to such second mesa(s) are defined by etching to form contact regions to the p-type modulation doped QW structure 20 for the vertical cavity thyristor device. P-type ions 110 are implanted through the second mesa(s) into the resultant structure for contact to p-type modulation doped QW structure 20 of the vertical cavity thyristor device.

One or more third mesas as well as sidewalls leading to such third mesa(s) are defined by etching to form contact regions to the bottom n-type ohmic contact layer(s) 12 for the vertical cavity thyristor device.

A thermal anneal process is performed to activate the earlier-implanted ion-implant regions. In one embodiment, the thermal anneal process involves deposition of a capping layer of nitride and carrying out the anneal process at 850° C. for a predefined time period. (e.g., 15 seconds).

Metallization of the remaining terminal electrodes can be carried out after the thermal anneal process, which can include metallization of n-channel control terminal 44 that is in contact with the N+ ion-implanted regions 108 for electrical contact to the n-type modulation doped QW structure 24 of the device structure, metallization of the p-channel control terminal 46 that is in contact with the P+ ion-implanted region 110 for electrical contact to the p-type modulation doped QW structure 20 of the device structure, and metallization of the cathode terminal 42 that is in contact with the bottom n-type ohmic contact layer(s) 14 of the device structure. In embodiments, the metal for the remaining terminal electrodes can be based on multilayer stacks of metal alloys that include tungsten (W), tungsten nitride ($W_2N$), nickel (Ni), tantalum (Ta), molybdenum (Mo), and combinations thereof.

Subsequent to metallization, the top DBR mirror layer 32 can be formed in the open region of the top aperture that is not covered by the anode terminal metal 40. Note that the top aperture and top DBR mirror layers 32 as described above can be configured to allow for light enter into the active region of the device structure.

After forming the top DBR mirror layers, optional anti-reflective coatings and light filtering structures 34 can be formed above the top DBR mirror layers 32 if needed.

FIG. 10 illustrates an exemplary arrangement of complementary HFETs Q3, Q4 that are coupled to a charging capacitor C, where the components are formed in the layer structure of FIG. 4 and can be used as part of the pixel element of the LIDAR detector array integrated circuitry described herein.

For the NHFET Q3, the gate region (layer(s) 28) can be exposed by etching away the layers that overlie the gate region, and a gate terminal electrode of the n-channel HFET device is formed on the gate region. A source terminal electrode and a drain terminal electrode of the NHFET Q3 can be operably coupled via n-type ion implanted contact regions to opposite sides of a QW channel(s) realized in the n-type modulation doped QW structure 24. One or more terminal electrodes can be operably coupled (for example, via contact to the bottom n-type contact layer 14 or by p-type ion implant regions to the intermediate spacer layer(s) 22) and used as collector (back-gate) terminal electrodes for the NHFET Q3.

For the PHFET Q4, the collector (back-gate) region (spacer layer(s) 22) can be exposed by etching away the layers that overlie the collector (back-gate) region. A shallow P+ type ion implant contact region can be implanted into the collector (back-gate) region. A collector (back-gate) terminal electrode can be formed on the collector (back-gate) region of the PHFET Q4. A source terminal electrode and a drain terminal electrode of the PHFET Q4 can be operably coupled via p-type ion implanted contact regions to opposite sides of a QW channel(s) realized in the p-type modulation doped QW structure 20. The bottom n-type ohmic contact layer 14 can be exposed in an area adjacent the gate region of the PHFET Q4 by etching away the layers that overlie the bottom n-type ohmic contact layer 14. A gate electrode can be formed on the bottom n-type ohmic contact layer 14 for contact to the PHFET Q4.

The complementary HFET transistors Q3 and Q4 are formed near one on another on the substrate 10 with a nitride layer 151 covering the sidewalls of the two HFET transistors Q3 and Q4 and extending continuously in the area between the HFET transistors Q3 and Q4 that forms the capacitor C (which is labeled "capacitor area"). An interconnect metal layer 153 is deposited on the nitride layer 151 and patterned such that one end of the interconnect metal layer 153 overlies and contacts the source terminal of the NHFET Q3 while the opposite end extends over the capacitor area and forms the bottom plate of the capacitor C as shown. A nitride layer 154 is deposited on the interconnect metal layer 153 and the nitride layer 151 and then patterned such that one end of the nitride layer 154 extends over the capacitor area and the opposite end is at or near the source terminal P+ metal of the PHFET Q4 as shown. An interconnect metal layer 155 is deposited on the nitride layer 154 and patterned such that one end of the interconnect metal layer 155 extends over the capacitor area and forms the top plate of the capacitor C while the other end overlies and contacts the source terminal P+ metal of the PHFET Q4 as shown. In this configuration, the nitride layer 154 is disposed between the interconnect metal layer 155 (top plate) and the interconnect metal layer 153 (bottom plate) in the capacitor area and thus forms the dielectric region of the capacitor C.

Note the other switching transistors (NHFETs Q1B, Q2A, Q5, Q7, Q8 and PHFETs Q1A, Q2B, Q6. Q9) as well the active load transistors for L1 and L2 of the pixel elements can be integrally formed on the substrate 10 and interconnected to one another with interconnect metal layers as needed to form the detector array integrated circuit.

Figure 11:
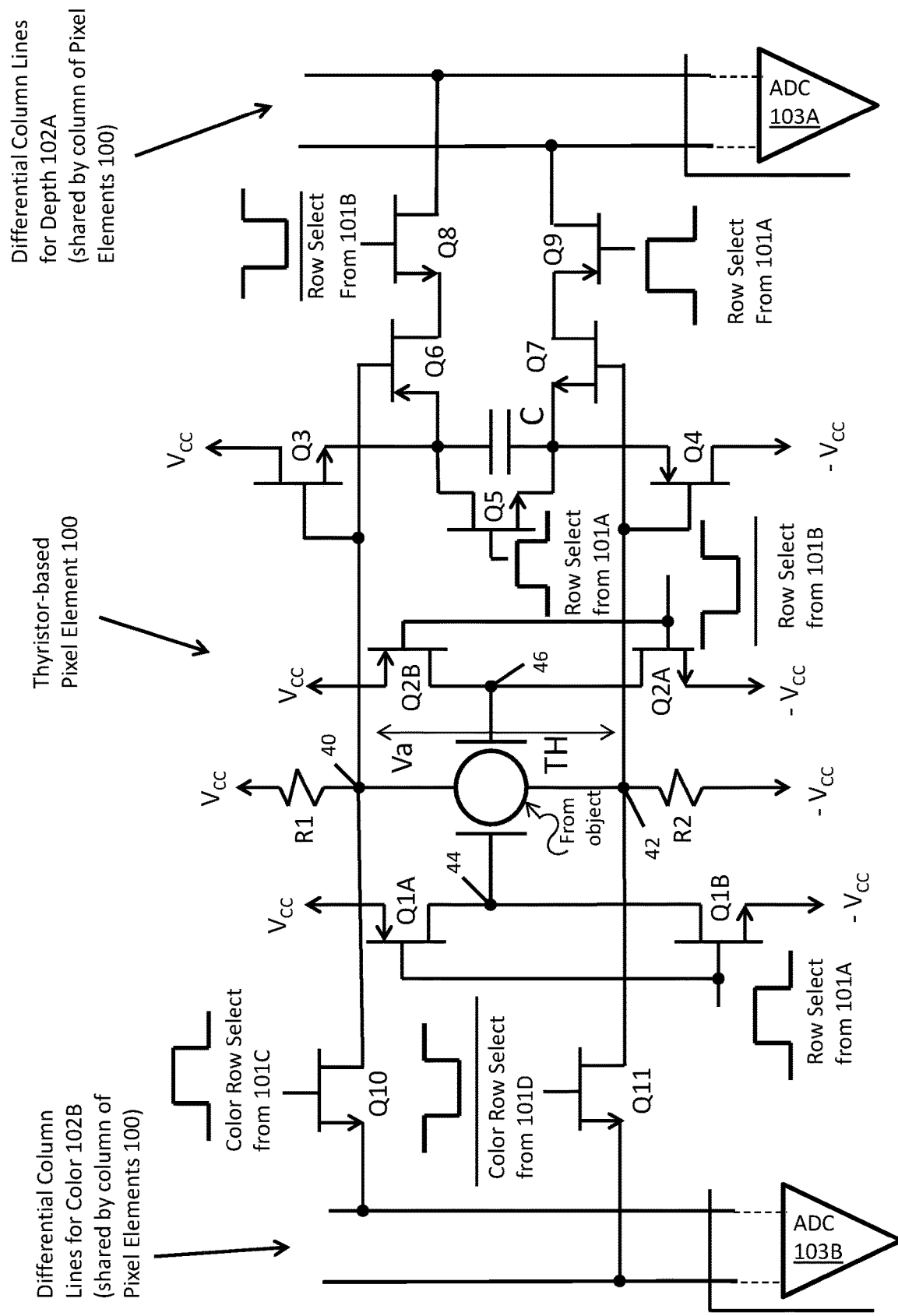
FIG. 11 is a circuit diagram of another exemplary thyristor-based pixel element for use as part of a detector array integrated circuit; the components and interconnections of the thyristor-based pixel element can be integrally formed with one another as part the detector array integrated circuit. The detector array integrated circuit is similar in architecture to the detector array of FIG. 2. In this embodiment, the imaging cycles (and corresponding imaging operations) performed by each thyristor-based pixel element include two different periods (and corresponding operations): i) a color imaging period where the vertical cavity thyristor device is configured as a photodetector that generates a voltage signal corresponding to visible light that is absorbed by the thyristor device, and where the voltage signal generated by the thyristor device is output to corresponding column lines (referred to as "column lines for color") for analog-to-digital conversion, and ii) a TOF detection period where the vertical cavity thyristor device is configured to terminate the charging of a capacitor upon receiving a return TOF pulse and to automatically output the voltage stored by the capacitor to corresponding column lines (referred to as "column lines for depth") for analog-to-digital conversion.

FIG. 11 is a circuit diagram of another exemplary thyristor-based pixel element for use as part of a detector array integrated circuit. In this embodiment, the components and interconnections of the thyristor-based pixel element can be integrally formed with one another as part the detector array integrated circuit. The detector array integrated circuit is similar in architecture to the detector array of FIG. 2; however, the pixel elements can be configured to obtain both spatial information (e.g., color information) as well as depth information as part of a single detector array. Furthermore, the detector array employs two sets of differential column lines shared by the pixel elements of a column of the detector array, the left-hand side set of differential column lines 102B for color imaging and the right-hand side set of differential column lines 120A for TOF and resultant depth (or z) imaging. There is ADC circuitry 103B per column associated with the left-hand side set of differential column lines 102B for color imaging, and ADC circuitry 103A per column associated with the right-hand side set of differential column lines 102A for TOF and resultant depth (z) imaging. Complementary row select signals (including Row Select and its complement "$\overline{\text{RowSelect}}$") as well as complementary color row select signals (including Color Row Select and its complement "$\overline{\text{ColorRowSelect}}$") are supplied to the pixel elements of a given row of the detector array to activate one row at a time and read out the color signal and TOF signal for the pixel elements of the active row. In embodiments, the A/D circuitry 103A, 103B and optionally the digital processing that determines the TOF of the reflected light pulse and corresponding object depth as well as the corresponding image data can be implemented by electronic circuitry and logic that can be integrally formed as part of the LIDAR detector array integrated circuit.

In the embodiment of FIG. 11, the active thyristor-based pixel element 100 performs an imaging cycle (and corresponding imaging operations) that includes two different periods (and corresponding operations): i) a color imaging period where the vertical cavity thyristor device TH is configured as a photodetector that generates a voltage signal corresponding to visible light that is absorbed by the thyristor device TH, and where the voltage signal generated by the thyristor device is output to corresponding column lines 102B (referred to as "column lines for color") for analog-to-digital conversion by ADC circuitry 103B, and ii) a TOF detection period where the vertical cavity thyristor device TH is configured to terminate the charging of the capacitor C upon receiving a return TOF pulse and to automatically output the voltage stored by the capacitor C to corresponding column lines 102A (referred to as "column lines for depth") for analog-to-digital conversion by ADC circuitry 103A.

FIGS. 12A, 12B, 12C, 12D and 12E are waveforms of timing signals for controlling the thyristor-based pixel element of FIG. 11 along with resulting signals that are produced by the thyristor-based pixel element; such resulting signals can be used to sense the spatial color of an object and also measure time-of-flight (TOF) information, which can be used to sense the spatial depth (z) of the object.

Figure 12:
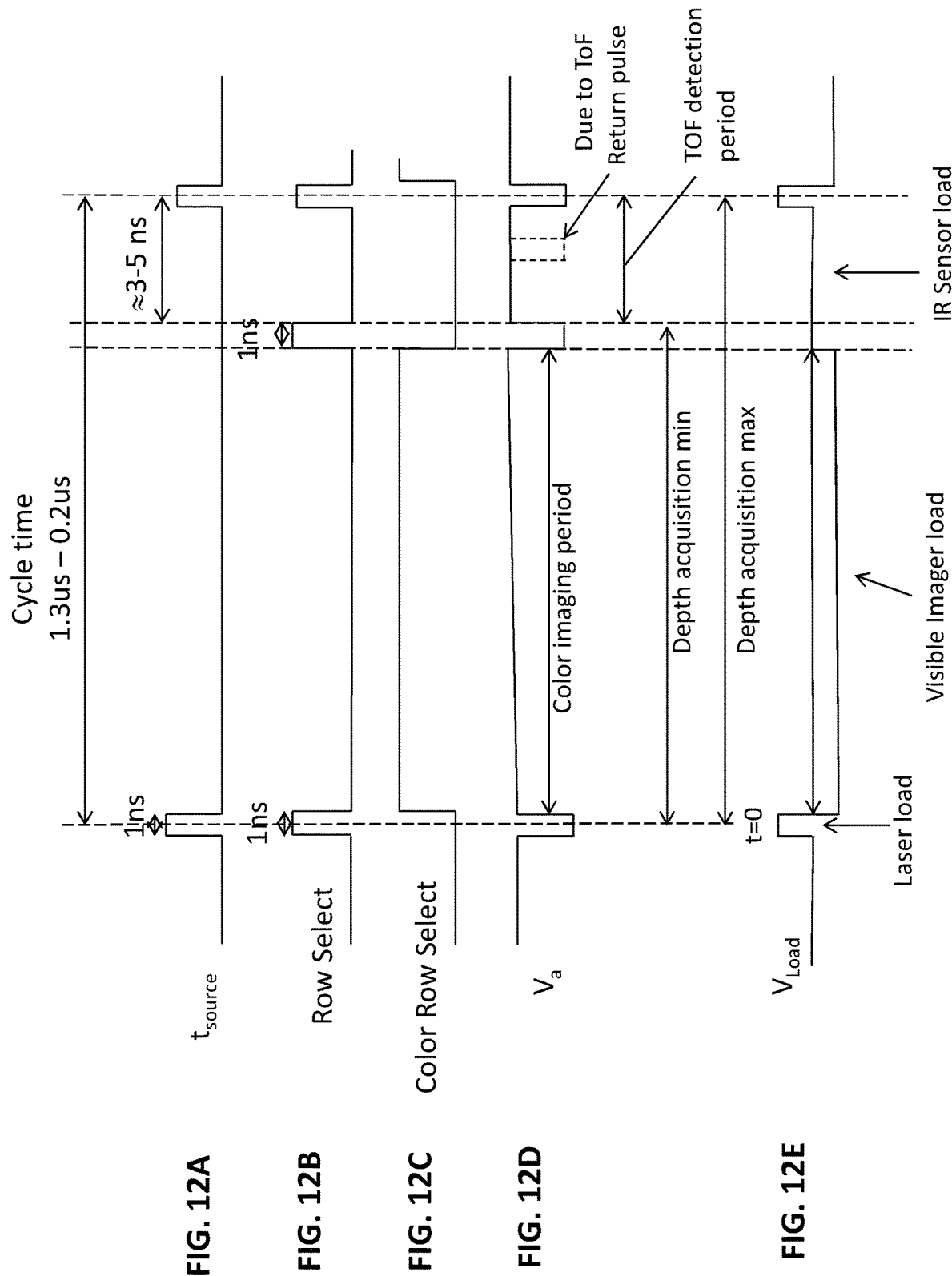
FIGS. 12A, 12B, 12C, 12D and 12E are waveforms of timing signals for controlling the thyristor-based pixel element of FIG. 11 along with resulting signals that are produced by the thyristor-based pixel element. Such resulting signals can be used to sense the spatial color (x,y) of an object and also measure time-of-flight (TOF) information, which can be used to sense the spatial depth (z) of the object.

More specifically, the pixel elements 100 (one shown in FIG. 11) for a given row of the detector array are activated by supplying an electrical $t_{source}$ pulse signal to the illumination source to emit an outgoing laser (optical) pulse at t=0 (or by receiving the electrical $t_{source}$ pulse signal from the illumination source) as shown in FIG. 12A. Complementary electrical row select signals (including Row Select and its complement "$\overline{RowSelect}$"), which are electrical activation pulses that are synchronous to the $t_{source}$ pulse signal, are applied to the pixel elements for the given row. In this manner, each pixel element of the given row receives a row select pulse at or near t=0 as shown in FIG. 12B as well as a complement row select pulse at or near t=0. Furthermore, complementary electrical color row select signals (including Color Row Select and its complement "$\overline{ColorRowSelect}$") are applied to the pixel elements for the given row as shown in FIG. 12C. In this manner, each pixel element of the given row receives a color row select pulse as shown in FIG. 12C as well as a complement color row select pulse that follow the row select pulse.

Figure 7:
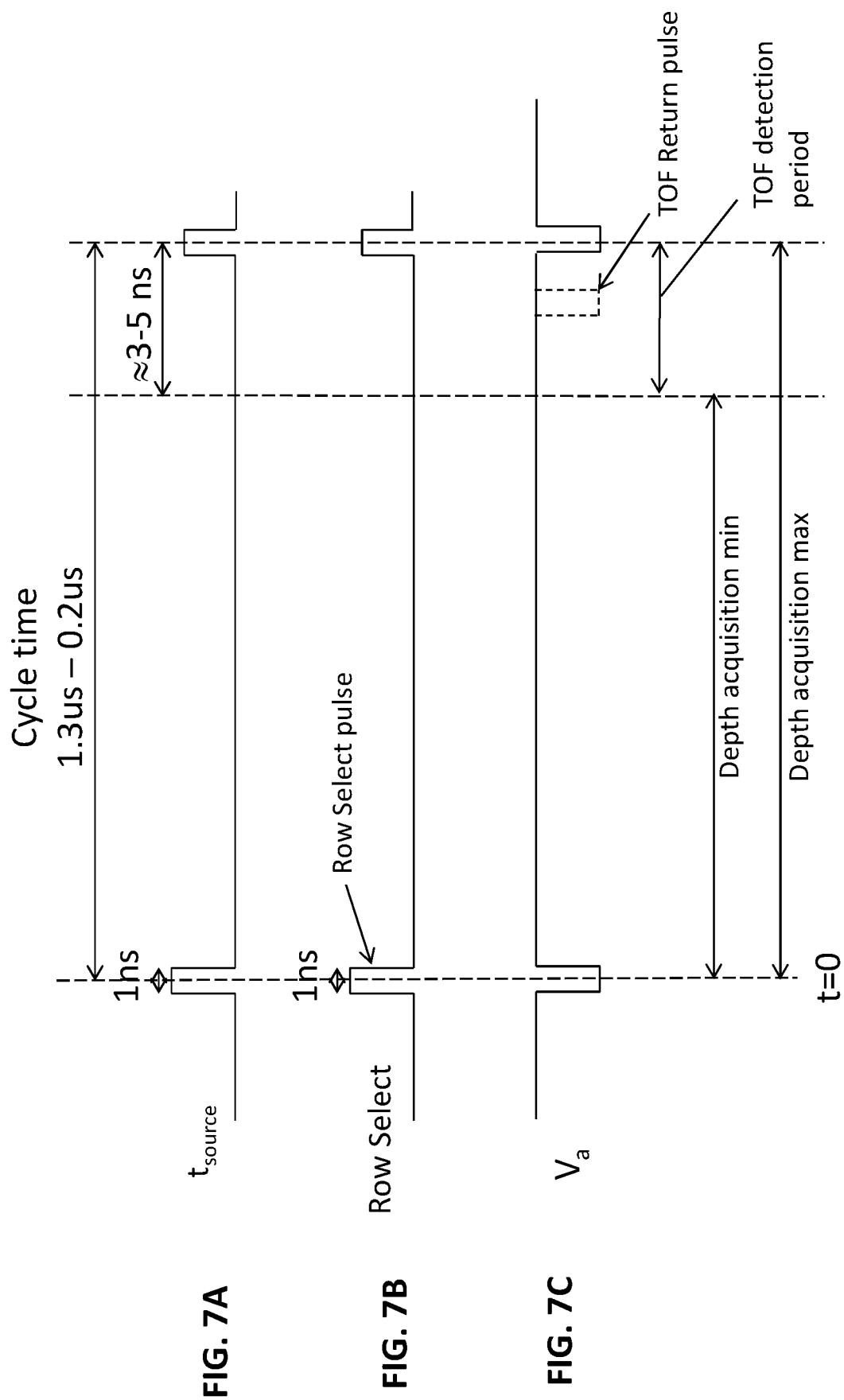
FIGS. 7A, 7B, and 7C are waveforms of timing signals for controlling the thyristor-based pixel element of FIG. 6 along with resulting signals that are produced by the thyristor-based pixel element. Such resulting signals can be used to measure time-of-flight (TOF) information, which can be used to sense the spatial depth (z) of an object.

In response to the receipt of the given row select pulse, the vertical cavity thyristor device switches ON and OFF to empty charge from the capacitor C and then begins to charge the capacitor C of the pixel element 100 in a manner similar to the operations of pixel element of FIG. 7 as described above.

Note that during the time when the vertical cavity thyristor device TH is in its OFF state, the pixel element 100 can also be illuminated with ambient visible (or white) light reflected from the object. If the object is in the dark, then only the IR strobe light is effective and thus only depth information may be obtained. But if the object is illuminated with ambient visible light, the incident visible light that returns to the pixel element allows the thyristor device to function as a photodiode and thus behaves as a classical 2D imager. In this case, the photocurrent response of the thyristor device in its OFF state can be used to determine a color value (Red, Green or Blue) for the pixel element, which can then be combined with the depth value obtained using the thyristor device of the very same pixel element to produce the complete 3D image.

Note that during the OFF state of the thyristor device TH after the termination of the row select pulse at or near t=0, the capacitor C is being charged by current flowing from the power supply voltages (e.g., $V_{CC}$ and $-V_{CC}$) through the active HFETs Q3 and Q4. This is substantially the major portion of the imaging cycle. Simultaneous to this initial charging of the capacitor C, photocurrent is produced by the vertical cavity thyristor device TH in response to detected ambient visible light, which causes voltage changes across the anode terminal 40 and the cathode terminal 42 of the thyristor device TH as shown in FIGS. 12D and 12E. FIG. 12D is the waveform of voltage $V_a$ between the anode terminal 40 and the cathode terminal 42 of the thyristor device TH. FIG. 12E is the waveform of voltage $V_L$ across the active loads L1 and L2 of the pixel circuit. The color row select pulse (FIG. 12C) and its complement color row select pulse are supplied to the HFETs Q10 and Q1 of the pixel element and configured to switch the source-drain current paths of HFETs Q10 and Q11 ON such that the voltage changes across the anode terminal 40 and the cathode terminal 42 of the thyristor device TH are output to the differential column lines 102B during the color imaging period. Furthermore, the color row select pulse (FIG. 12C) and its complement color row select pulse are configured to switch the source-drain current paths of HFETs Q10 and Q11 OFF at the termination of the color imaging period such that the differential column lines 102B are isolated from the pixel element for other time periods of the imaging cycles (including the TOF detection period).

Note that the color imaging period occurs in the short time interval where the IR light pulse emitted by the illumination source travels to the object and returns to the thyristor-based pixel element.

Also note that row select signal (and the complement row select signal) includes a secondary pulse that occurs between the color imaging period and the TOF detection period of the imaging cycle as evident from FIG. 12C. This secondary pulse switches the thyristor device ON and OFF to return the thyristor device to its OFF state and empties charge from the capacitor C and begins to charge the capacitor C of the pixel element 100 in a manner similar to the TOF detection operations of pixel element of FIG. 7 as described above. To account for this operation, the measured TOF and corresponding depth can be adjusted based on the duration of the color imaging period. In essence, the depth (z) as given by Eqn. (1) can be adjusted by adding a value the duration of the color imaging period to $V_{meas}$.

Figure 13:
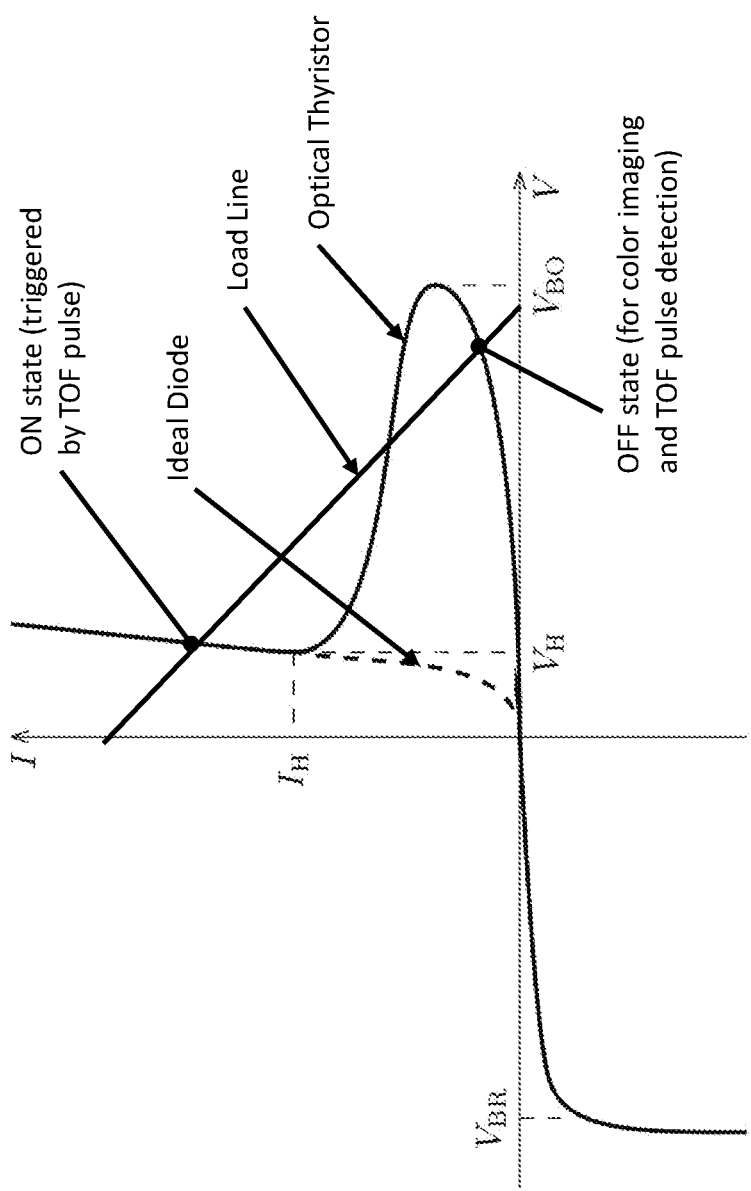
FIG. 13 is a current-voltage curve that describes the operational characteristics of the thyristor device of the pixel element of FIG. 11.

Exemplary OFF and ON states of an illustrative vertical cavity thyristor device TH of FIG. 11 is shown in FIG. 13. Note that the current-voltage curve of the illustrative vertical cavity thyristor device TH can be shifted by controlling the current applied to the n-channel control electrode 44 and/or the p-channel control electrode 46 in the OFF state of the thyristor device TH. Furthermore, the location of the OFF state along the current-voltage curve can be set by the load line according to the resistance values of the active loads R1 and R2. In embodiments, the current voltage curve and/or location of the OFF state can be configured based on desired sensitivity and noise rejection characteristics (which can account for ambient light conditions).

The vertical cavity thyristor device of FIG. 9 as well as the complementary switching transistors (NHFET and PHFET) and capacitor as shown in FIG. 10 can be integrally formed on the substrate and interconnected to one another with interconnect metal layers as needed to form the pixel elements of FIG. 11 of the detector array integrated circuit.

In other embodiments, different timing schemes can be used to control the operations of the pixel element of FIG. 11, such as interleaving the color imaging periods and the depth TOF periods (alternate color and z waveforms). However, the timing control of FIGS. 12A to 12E as described above is expected to be more efficient because it makes use of the same timing window for both, and obtains both types of data simultaneously from the same pixel corresponding to a unique point in the scene. However, the timing of the color row select pulses must be adjusted for the maximum size of object that may be detected.

It is noted the pixel element of FIG. 11 can incorporate a suitable color filter (red, green or blue) to obtain a full color image. It is important therefore with this operation that the color filter for each pixel element be transmissive to the wavelength of light of the light pulse emitted by the illumination source. It is also important that the stop band of the top mirror of the vertical cavity thyristor device (which is transmissive to the wavelength of light of the light pulse emitted by the illumination source and returned as the TOF return pulse) also be transmissive to the wavelength range of visible light. Both these conditions can be satisfied for the case where the wavelength of light of the light pulse emitted by the illumination source is in the IR spectrum around 980 nm. In this case, it has been documented that the color filter technology used in current CMOS APS arrays are transmissive to light in the IR spectrum around 980 nm.

Figure 1:
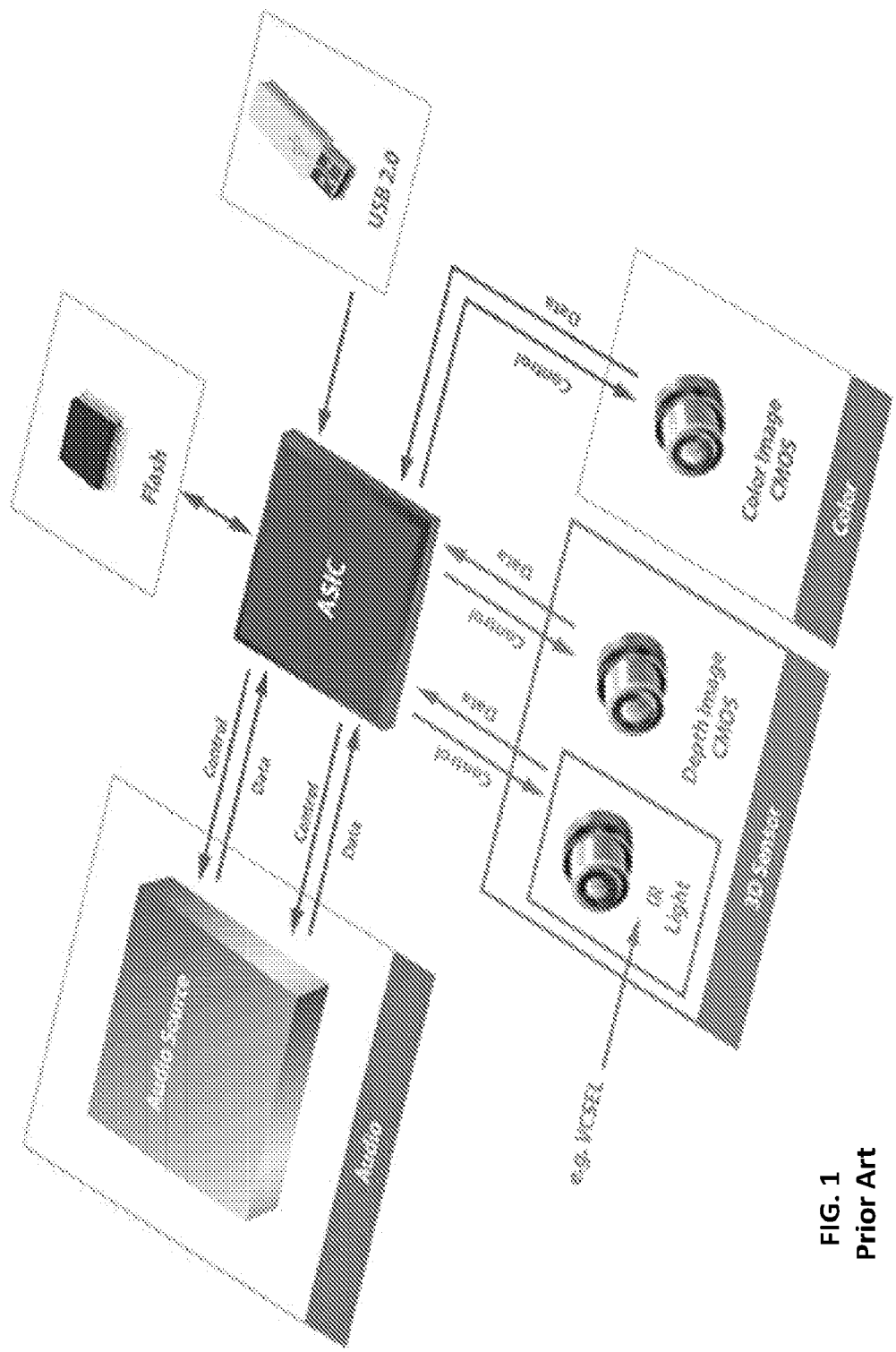
FIG. 1 is a schematic illustration of the components of an exemplary prior art 3D imaging system.

One advantage of the photodiode operation of the thyristor device of FIG. 11 is that the built-in gain allows a more sensitive operation that a standard photodiode. This may totally eliminate the need for a per-pixel amplifier. Furthermore, this approach has the advantage of eliminating the need for two imagers as shown in the state-of-the-art 3D imaging system in FIG. 1. It also means that a large portion of the processing could possibly be done as part of same integrated circuit as the detector array, which can possibly eliminate the ASIC. Overall a much cheaper solution is possible.

Note that the color signal is measured as the voltage $V_L$ across the load elements L1 and L2 as shown in FIG. 12E. In this case, the measured voltage $V_L$ can be in the mV range (1-10 mV), and thus amplification may be required to amplify this signal for the input voltage range of the ADC circuitry 103B (for example, 0 to 0.5V). This can be accomplished with an amplifier per set of differential column lines, which can be considered part of the front end of the ADC circuitry 103B. In alternate embodiments, each pixel element can possibly include an amplifier stage that buffers or amplifies the voltage drop signal across the load elements L1 and L2 of the respective pixel element for supply to the differential column lines 103B.

Similarly, amplification may be required to amplify the voltage signal output by the capacitor of the pixel element for the input voltage range of the ADC circuitry 103A (FIG. 11) or ADC circuitry 103 (FIG. 7). This can be accomplished with an amplifier per set of depth differential column lines, which can be considered part of the front end of the ADC circuitry 103A or ADC circuitry 103. In alternate embodiments, each pixel element can possibly include an amplifier stage that buffers or amplifies the voltage signal output by the capacitor C of the respective pixel element for supply to the depth differential column lines 102A (FIG. 11) or 102 (FIG. 7).

It is noted that both the depth (z) data and the color (x,y) data utilize differential operation to feed the data signals to the appropriate ADC circuitry. These positive and negative going signals are obtained naturally from the thyristor with the use of the positive and negative dual power supplies. Such differential operation provides an extra level of noise immunity for the transfer of small signals across the detector array.

In alternate embodiments, single-ended column lines may be used. In order to convert the differential operation to single ended operation, a level shifting operation would be required. In this case, little real estate could be conserved because ground lines would then be required. It is seen that one of the benefits of the thyristor symmetry between n-type and p-type devices is that differential outputs are a natural consequence.

In yet alternate embodiments, the target object can also be illuminated with continuous IR light emitted by a suitable IR illumination source. In this embodiment, the IR illumination source can be controlled to emit the continuous IR light while the pulsed IR source emits pulses of IR light as described herein for TOF detection. The OFF state of the vertical cavity thyristor device can be used to sense the IR light reflected from the object for obtaining spatial (x,y) imaging in the same manner as the color imaging using reflection of ambient visible light as described above. Such operations are useful for obtaining both spatial depth (z) information and spatial (x,y) image data of objects in the field of view of the LIDAR system even in the dark.

In still other embodiments, a pulsed-mode laser source (e.g., VCSEL array) that emits the pulses of laser light for TOF detection and/or a continuous-mode IR illumination source (e.g., VCSEL array) for spatial imaging can be integrated together with the LIDAR detector array as described herein as part of a single integrated circuit.

There are several advantages of the thyristor-based pixel elements for lidar sensing as compared to the prior art phase based lidar approach as follows:
  less complex waveforms and calculations and fewer signals that require ADC; this can afford shorter computation time and faster response;
  only one imaging cycle is used per data point because the detector is not charging the capacitor;
  the thyristor device of the pixel elements benefits from its internal gain to sense the weakest of signal, which is not possible with standard detector;
  more signal is available because the capacitor is integrating the power supply voltage and not the received optical power;
  the fill factor of the detector array does not relate to sensitivity but only to resolution; the thyristor-based pixel element can provide a better fill factor as there is only one capacitor per pixel element;
  demodulation contrast is not an issue since it does not exist with the thyristor-based pixel element;
  photocarrier collection is improved through the resonant cavity of the thyristor-based pixel element;
  unlike the lateral CMOS detector in the integrated Si implementation, there is no tradeoff of carrier collection with depth of field lines;
  Pixel reset noise can be reduced because there is only one capacitor per pixel;
  SNR can be improved as the number of electrons collected is determined by $V_{CC}$ and not $P_i$; therefore, less noise since no photon shot noise.
  Multiple measurements are not required, multiple sub-frames not required;
  The ADC circuitry can perform a continuous ADC operation so in principle a signal is available when the thyristor device of the pixel element is switched.

The result is an overall faster response with better resolution at greater distances with an improvement in reaction time compared to the conventional implementation; and the size, weight and power of the system can be significantly reduced.

There have been described and illustrated herein several embodiments of a LIDAR detector array integrated circuit. While particular embodiments of the invention have been described, it is not intended that the invention be limited thereto, as it is intended that the invention be as broad in scope as the art will allow and that the specification be read likewise. Thus, while particular group III-V material system and heterostructures have been disclosed, it will be appreciated that other III-V material systems and heterostructures can be used to realize the optoelectronic integrated circuitry as described herein. It will therefore be appreciated by those skilled in the art that yet other modifications could be made to the provided invention without deviating from its spirit and scope as claimed.

What is claimed is:

1. An optoelectronic integrated circuit for use in a LIDAR system that includes a light source that is configured to emit an optical TOF pulse for reflection by an object, the optoelectronic integrated circuit comprising:
   an array of pixel elements arranged in columns and rows with at least one column line for each column of pixel elements, wherein each pixel element includes a vertical cavity thyristor device and a capacitor that are configured such that the capacitor generates a measured voltage signal corresponding to TOF of the optical TOF pulse that returns from the object, wherein the measured voltage signal is transferred to the at least one column line for the pixel element in order to determine depth of the object.

2. An optoelectronic integrated circuit according to claim 1, wherein:
   the vertical cavity thyristor device is configured to switch from an OFF state to an ON state due to absorption of light of the optical TOF pulse that returns from the object, wherein such switching action of the vertical cavity thyristor device is configured to interrupt a charge integration function of the capacitor such that the capacitor generates the measured voltage signal corresponding to TOF of the optical TOF pulse that returns from the object.

3. An optoelectronic integrated circuit according to claim 2, wherein:
   the vertical cavity thyristor device has an anode terminal and a cathode terminal; and
   each pixel element further includes at least one charging transistor, operably coupled between a voltage supply terminal and the capacitor, that is configured to charge the capacitor when the vertical cavity thyristor device is in its OFF state based on voltage of the anode terminal, voltage of the cathode terminal, or both.

4. An optoelectronic integrated circuit according to claim 3, wherein:
   the at least one charging transistor includes an n-type HFET transistor and a p-type HFET transistor, the n-type HFET transistor having a gate terminal that is connected to the anode terminal with a source-drain current path between a positive voltage supply terminal and the capacitor, the p-type HFET transistor having a gate terminal that is connected to the cathode terminal with a source-drain current path between a negative voltage supply terminal and the capacitor, wherein the switching action of the vertical cavity thyristor device from its OFF state to its ON state due to absorption of light of the optical TOF pulse that returns from the object switches the source-drain current paths of the n-type HFET and p-type HFET transistors ON.

5. An optoelectronic integrated circuit according to claim 3, wherein:
   each pixel element further includes at least one charge transfer transistor, operably coupled between the capacitor and the at least one column line for the pixel element, that is activated to transfer the measured voltage signal to at least one column line for the pixel element.

6. An optoelectronic integrated circuit according to claim 5, wherein:
   the at least one charge transfer transistor includes at least one thyristor-controlled charge transfer transistor that is activated based on voltage of the anode terminal, voltage of the cathode terminal, or both in order to transfer the measured voltage signal to at least one column line for the pixel element when the vertical cavity thyristor device switches from the OFF state to the ON state due to absorption of the optical TOF pulse that returns from the object.

7. An optoelectronic integrated circuit according to claim 6, wherein:
   the at least one thyristor-controlled charge transfer transistor includes an n-type HFET transistor and a p-type HFET transistor, the p-type HFET transistor having a gate terminal that is connected to the anode terminal with a source-drain current path coupled between a terminal of the capacitor and a column line for the pixel element, the n-type HFET transistor having a gate terminal that is connected to the cathode terminal with a source-drain current path between another terminal of the capacitor and another column line for the pixel element, wherein the source-drain current paths of the p-type HFET and the n-type HFET transistors turn ON when the vertical cavity thyristor device switches from the OFF state to the ON state due to absorption of the optical TOF pulse that returns from the object.

8. An optoelectronic integrated circuit according to claim 6, wherein:
   the at least one charge transfer transistor further includes at least one reset isolation transistor that is configured to isolate the pixel element from the at least one column line for the pixel element in response to an electrical activation pulse that resets the vertical cavity thyristor device into its OFF state and empties any charge stored by the capacitor of the pixel element.

9. An optoelectronic integrated circuit according to claim 8, wherein:
   the at least one reset isolation transistor includes an n-type HFET transistor and a p-type HFET transistor, the p-type HFET transistor having a gate terminal that receives the electrical activation pulse with a source-drain current path coupled between a terminal of the capacitor and a column line for the pixel element, the n-type HFET transistor having a gate terminal that receives a complement electrical activation pulse with a source-drain current path between another terminal of the capacitor and another column line for the pixel element, wherein the source-drain current paths of the p-type HFET and n-type HFET transistors turn OFF in response to the electrical activation pulse and complement electrical activation pulse.

10. An optoelectronic integrated circuit according to claim 3, wherein:
  each pixel element further includes at least one thyristor reset transistor configured to switch the vertical cavity thyristor device ON and then OFF in response to an electrical activation pulse in order to activate the at least one charging transistor and initiate charging of the capacitor.

11. An optoelectronic integrated circuit according to claim 10, wherein:
  the vertical cavity thyristor device includes at least one of an n-channel control terminal and a p-channel control terminal; and
  the at least one thyristor reset transistor includes at least one of a first p-type HFET transistor, a first n-type HFET transistor, a second p-type HFET transistor, and a second n-type HFET transistor, the first p-type HFET transistor having a gate terminal that receives the electrical activation pulse with a source-drain current path coupled between a positive voltage supply terminal and the n-channel control terminal, the first n-type HFET transistor having a gate terminal that receives the electrical activation pulse with a source-drain current path between a negative voltage supply terminal and the n-channel control terminal, the second p-type HFET transistor having a gate terminal that receives a complement electrical activation pulse with a source-drain current path coupled between the positive voltage supply terminal and the p-channel control terminal, the second n-type HFET transistor having a gate terminal that receives the complement electrical activation pulse with a source-drain current path between a negative voltage supply terminal and the p-channel control terminal.

12. An optoelectronic integrated circuit according to claim 10, wherein:
  each pixel element further includes a capacitor reset transistor that is configured to empty charge stored by the capacitor in response to the electrical activation pulse or complement electrical activation pulse.

13. An optoelectronic integrated circuit according to claim 12, wherein:
  the capacitor reset transistor comprises an HFET transistor with a source-drain current path that is activated by the electrical activation pulse or complement electrical activation pulse such that resistance of the source-drain current path empties charge stored by the capacitor.

14. An optoelectronic integrated circuit according to claim 10, wherein:
  the pixel elements of a row of the array are operated by supplying the electrical activation pulse and optionally a complement electrical activation pulse to the pixels elements of the row to thereby initiate a TOF detection period that follows the electrical activation pulse for the pixel elements of the row.

15. An optoelectronic integrated circuit according any preceding claim, further comprising:
  a plurality of analog-to-digital conversion circuits each corresponding to a different column of pixel elements and operably coupled to the at least one column line for the corresponding column of pixel elements, where each analog-to-digital conversion circuit is configured to convert the voltage signals output by the corresponding column of the pixel elements into the digital domain in order to determine the depth of the object.

16. An optoelectronic integrated circuit according to any preceding claim 1, wherein:
  each pixel element includes an amplifier circuit that amplifies the measured voltage signal generated by the capacitor of the pixel element for supply to the corresponding at least one column line.

17. An optoelectronic integrated circuit according to claim 1, wherein:
  the at the least one column line for each column of pixel elements comprises a pair of differential column lines; or
  the at the least one column line for each column of pixel elements comprises a single column line.

18. An optoelectronic integrated circuit according to claim 10, further comprising:
  at least one other column line for each column of pixel elements used for spatial imaging of the object, wherein the vertical cavity thyristor device of each pixel element is further configured in its OFF state to absorb other light that is reflected by the object and generate photocurrent at the anode terminal and cathode terminal of the vertical cavity thyristor device, wherein the photocurrent is transferred to the at least one other column line for the pixel element for the spatial imaging of the object.

19. An optoelectronic integrated circuit according to claim 18, wherein:
  the other light that is reflected by the object and absorbed by the vertical cavity thyristor device comprises ambient visible light; and
  a color filter is associated with the vertical cavity thyristor device and configured to transmit a predetermined color of visible light to the vertical cavity thyristor device.

20. An optoelectronic integrated circuit according to claim 18, wherein:
  the other light that is reflected by the object and absorbed by the vertical cavity thyristor device comprises infrared light that is emitted by a continuous IR light source.

21. An optoelectronic integrated circuit according to claim 18, wherein:
  each pixel element further includes at least one current transfer transistor, operably coupled between at least one of the anode terminal and cathode terminal of the vertical cavity thyristor device, that is activated to transfer the photocurrent generated by the vertical cavity thyristor device to at least one other column line for the pixel element.

22. An optoelectronic integrated circuit according to claim 21, wherein:
  the at least one current transfer transistor is activated to transfer the photocurrent generated by the vertical cavity thyristor device to at least one other column line for the pixel element in response to an electrical signal that follows an electrical activation pulse that resets the vertical cavity thyristor device into its OFF state.

23. An optoelectronic integrated circuit according to claim 22, wherein:
  the electrical signal is further configured to deactivate the at least one current transfer transistor of each pixel element in order to isolate the pixel element from the at least one other column line for the pixel element for a TOF detection period.

24. An optoelectronic integrated circuit according to claim 23, wherein:
  the at least one current transfer transistor comprises an HFET transistor having a gate terminal that receives the electrical signal with a source-drain current path coupled between one of the anode terminal and cathode terminal of the vertical cavity thyristor device and one other column line of the pixel element used for spatial imaging.

25. An optoelectronic integrated circuit according to claim 22, wherein:

the pixel elements of a row of the array are controlled by supplying a first electrical activation pulse and optionally a first complement electrical activation pulse to the pixels elements of the row in order to reset the vertical cavity thyristor devices of the pixel elements of the row, followed by an electrical signal and optionally a complement electrical signal that activates the at least one current transfer transistor of the pixel elements of the row in order to initiate an imaging detection period, and followed by a second electrical activation pulse and optionally a second complement electrical activation pulse to the pixels elements of the row in order to reset the vertical cavity thyristor devices of the pixel elements of the row and initiate a TOF detection period that follows the image detection period for the pixel elements of the row.

26. An optoelectronic integrated circuit according to claim 18, further comprising:

a plurality of analog-to-digital conversion circuits each corresponding to a different column of pixel elements and operably coupled to the at least one other column line for the corresponding column of pixel elements, where each analog-to-digital conversion circuit is configured to convert signals output by the corresponding column of the pixel elements into the digital domain for spatial imaging of the object.

27. An optoelectronic integrated circuit according to claim 18, wherein:

each pixel element optionally includes an amplifier circuit that amplifies the current signal generated by the vertical cavity thyristor device for supply to the corresponding at least one other column line.

28. An optoelectronic integrated circuit according to claim 18, wherein:

the at the least one other column line for each column of pixel elements comprises a pair of differential column lines; or the at the least one other column line for each column of pixel elements comprises a single column line.

29. An optoelectronic integrated circuit according to claim 1, wherein:

the light source that emits the optical TOF pulse for reflection by the object is integrally formed as part of the optoelectronic integrated circuit.

30. An optoelectronic integrated circuit according to claim 1, wherein:

the pixel elements of the array are formed from an epitaxial layer structure that includes complementary modulation doped quantum well structures.

31. An optoelectronic integrated circuit according to claim 30, wherein:

the complementary modulation doped quantum well structures include an n-type modulation doped quantum well structure formed above a p-type modulation doped structure, wherein the n-type modulation doped quantum well structure includes an n-type charge sheet spaced above one or more quantum wells by at least one undoped spacer layer, and wherein the p-type modulation doped quantum well structure includes a p-type charge sheet spaced below one or more quantum wells by at least one undoped spacer layer.

32. An optoelectronic integrated circuit according to claim 31, wherein:

the n-type modulation doped quantum well structure is spaced above the p-type modulation doped structure by at least one spacer layer.

33. An optoelectronic integrated circuit according to claim 1, wherein:

the vertical cavity thyristor device employs a resonant cavity for the wavelength of light of the optical TOF pulse that reflects from the object.

34. An optoelectronic integrated circuit according to claim 1, further comprising:

a continuous IR light source that emits infrared light for reflection by the object is integrally formed as part of the optoelectronic integrated circuit.

* * * * *